US012627516B2

(12) United States Patent
Seidemann et al.

(10) Patent No.: US 12,627,516 B2
(45) Date of Patent: May 12, 2026

(54) QUANTUM-COMPUTING SECURE DIGITAL AND PHYSICAL PROOF OF WORK

(71) Applicant: BASF SE, Ludwigshafen am Rhein (DE)

(72) Inventors: Lothar Seidemann, Ludwigshafen am Rhein (DE); Holger Kai Peter Jelich, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 21 days.

(21) Appl. No.: 18/833,946

(22) PCT Filed: Jan. 30, 2023

(86) PCT No.: PCT/EP2023/052114
§ 371 (c)(1),
(2) Date: Jul. 29, 2024

(87) PCT Pub. No.: WO2023/144360
PCT Pub. Date: Aug. 3, 2023

(65) Prior Publication Data
US 2025/0106050 A1 Mar. 27, 2025

(30) Foreign Application Priority Data
Jan. 31, 2022 (EP) ..................................... 22154318

(51) Int. Cl.
*H04L 9/00* (2022.01)

(52) U.S. Cl.
CPC ..................................... *H04L 9/50* (2022.05)

(58) Field of Classification Search
CPC ....................................................... H04L 9/50
See application file for complete search history.

(56) References Cited

U.S. PATENT DOCUMENTS 11,671,258 B1* 6/2023 Willardson ........... H04L 9/3297
380/1
2019/0205889 A1* 7/2019 Cantrell ........... G06Q 20/40145
(Continued)

FOREIGN PATENT DOCUMENTS

| | | |
|---|---|---|
| EP | 3934222 A1 | 1/2022 |
| WO | 2018/172185 A1 | 9/2018 |
| WO | 2021/001147 A1 | 1/2021 |

OTHER PUBLICATIONS

"Block hashing algorithm", Wikipedia, Feb. 20, 2021.
(Continued)

*Primary Examiner* — Andrew Suh
(74) *Attorney, Agent, or Firm* — Faegre Drinker Biddle & Reath LLP

(57) ABSTRACT

A computer-implemented method for proof-of-work for generating and validating a block of a blockchain using at least one printing device is disclosed. The printing device is configured for generating at least one digital image depending on a printer control setting. The method comprises the following steps:

i) (110) determining a plurality of number strings by solving at least one cryptographic puzzle;

ii) (118) selecting one of the number strings of the determined plurality of number strings as mining printer control setting;

iii) (120) printing at least one initial digital image (116) comprising a plurality of colored pixels by using the printing device with the selected mining printer control setting (112) and scanning the printed image by using at least one scanning device, thereby generating a mining digital image (122) having a plurality of colored pixels different from the initial digital image (116);

iv) (124) comparing the colored pixels of the mining digital image (122) and a task digital image (114) by
(Continued)

using at least one processing device, wherein the task digital image (114) comprises a plurality of colored pixels being different from the initial digital image (116).

The method comprises repeating steps ii) (118) to iv) (124) until the colored pixels of the mining digital image (122) and the task digital image (114) are found to be identical. In each case in step ii) (118) a different mining printer control setting (112) is selected. The mining printer control setting (112) for which the mining digital image (122) and the task digital image (114) are found to be identical, at least within tolerances, is used as the proof-of-work for generating and validating the block of the blockchain.

15 Claims, 1 Drawing Sheet

(56) References Cited

U.S. PATENT DOCUMENTS

| | | | | |
|---|---|---|---|---|
| 2022/0057519 | A1* | 2/2022 | Goldstein | ............... G01S 17/88 |
| 2022/0147974 | A1* | 5/2022 | Law | ........................ G06F 21/34 |
| 2022/0391887 | A1* | 12/2022 | Jakobsson | ............. H04L 9/3239 |

OTHER PUBLICATIONS

"Blockchain", Wikipedia, Oct. 16, 2024.
"Convert colors and color values | RGB, HEX, HSV, HSL, CMYK", 2024.
"HEX to RGB Color Converter", Dan's Tools, 2021.
"Hex to RGB Color Converter", RapidTables.
Antonopoulos, "Mastering Bitcoin", O'Reilly Media, Inc, vol. 2, No. 1, Jun. 2017, pp. 1-405.
European Search Report for EP Patent Application No. 22154318.4, Issued on Jul. 28, 2022, 5 pages.
Ghosh et al., "A Study on the Issue of Blockchain's Energy Consumption", Proceedings of International Ethical Hacking Conference 2019, Nov. 30, 2019, pp. 63-75.
Reys-Garcia E., "Chapter 2: Describing Graphical Information", The Image-Interface: Graphical Supports for Visual Information, vol. 3, Oct. 2017, pp. 41-114.
Reys-Garcia E., Chapter 2: Describing Graphical Information, The Image-Interface: Graphical Supports for Visual Information, 3:41-114 (Oct. 2017).
Sedlmeir et al., "The Energy Consumption of Blockchain Technology: Beyond Myth", Business & Information Systems Engineering, vol. 62, No. 6, Jun. 19, 2020, pp. 599-608.
Antonopoulos, "Mastering Bitcoin", Retrieved from the link: "https://www.oreilly.com/library/view/mastering-bitcoin-2nd/9781491954379", Jul. 21, 2017.
International Preliminary Report on Patentability received for PCT Patent Application No. PCT/EP2023/052114, mailed on Aug. 15, 2024, 8 pages.
Billings, "Image-based Proof of Work Algorithm for the Incentivization of Blockchain Archival of Interesting Images", Cryptography and Security, Jul. 14, 2017, pp. 1-30.
International Search Report and Written Opinion received for PCT Patent Application No. PCT/EP2023/052114, mailed on Feb. 28, 2023, 11 pages.

* cited by examiner

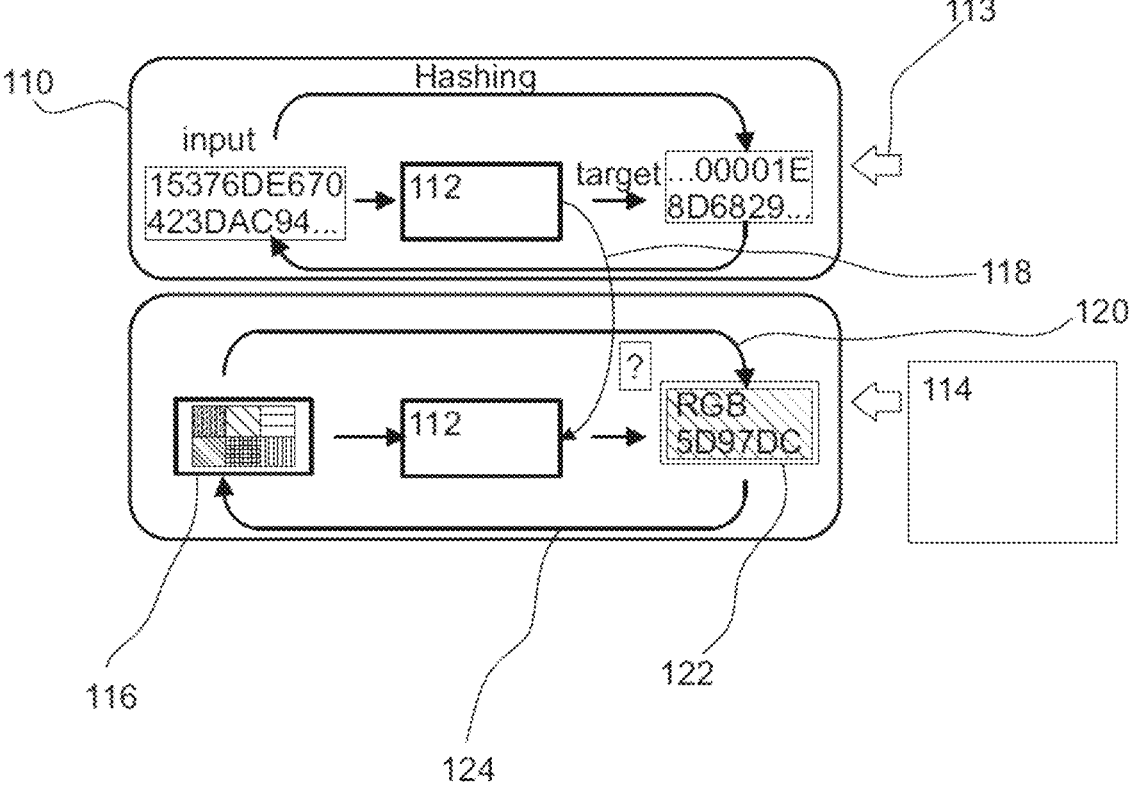

QUANTUM-COMPUTING SECURE DIGITAL AND PHYSICAL PROOF OF WORK

CROSS-REFERENCE TO RELATED APPLICATIONS

This application is a National stage application (under 35 U.S.C. § 371) of PCT/EP2023/052114, filed Jan. 30, 2023, which claims benefit of European Application No. 22154318.4, filed Jan. 31, 2022, both of which are incorporated herein by reference in their entirety.

TECHNICAL FIELD

The invention relates to a computer-implemented method for proof-of-work for generating and validating a block of a blockchain using at least one printing device, and uses of said method, such as for trading crypto currency. The method and uses according to the present invention specifically may be used for secured processing of transactions in the fields of smart contracts, financial services, healthcare, personal identification, cryptocurrencies, supply chain. Other applications are possible.

BACKGROUND ART

In many applications, such as in the fields of financial services, healthcare, personal identification, cryptocurrencies, supply chain and others, the blockchain technology is an efficient technology to ensure the secured processing of transactions such as of licensing, cooperation with other companies and selling technology.

A blockchain is a growing list of records, called blocks, that are linked using cryptography. Each block contains a cryptographic hash of the previous block, a timestamp, and transaction data. By design, a blockchain is resistant to modification of the data. It is "an open, distributed ledger that can record transactions between two parties efficiently and in a verifiable and permanent way", see en.wikipedia.org/wiki/Blockchain. For use as a distributed ledger, a blockchain is typically managed by a peer-to-peer network collectively adhering to a protocol for inter-node communication and validating new blocks. Each block includes the cryptographic hash of the prior block in the blockchain, linking the two. The linked blocks form a chain. This iterative process confirms the integrity of the previous block, all the way back to the original genesis block. The blockchain technology typically requires a cryptographic hash function, multiple information needs to be processed and a Hash function to map data of arbitrary size to fixed-size values such that the data in any given block cannot be altered retroactively.

Eshani et al, "A study on the issue of blockchain's energy consumption", DOI: 10.1007/978-981-15-0361-0_5, describe that blockchain technology is one of the biggest innovative technology that has been developed and has potential usage in fields of education, business and industries. Since the creation of bitcoins, blockchain has emerged as a means for storing digital information without the intervention of any third parties. However, now it is used for various other applications than just being a simple distributed ledger. With time it has imposed a larger impact an different fields of economy and has gained popularity for its immutability. But, there are some issues faced by blockchain. One of such issues is the energy consumption. Blockchains are found to consume exorbitant amount of energy because of the algorithm followed for its creation. Johannes Sedlmeir et al., "The Energy Consumption of Blockchain Technology: Beyond Myth", Bus Inf Syst Eng 62 (6): 599-608 (2020), https://doi.org/10.1007/s12599-020-00656-x and Eshani Ghosh and Baisakhi Das, "A study on the issue of blockchain's energy consumption", January 2020, DOI: 10.1007/978-981-15-0361-0_5, Proceedings of International Ethical Hacking Conference 2019 (pp. 63-75), describe enormous energy consumption needed for blockchain technology, in particular for proof-of-work.

In view of recent progress in computer technology such as the development of quantum computing, there is a risk that suddenly significant more computing power is available to perform the digital proof-of-work and is threatening the security of the cryptocurrency.

PROBLEM TO BE SOLVED

It is therefore desirable to provide methods and devices, which address the above-mentioned technical challenges. Specifically, a computer-implemented method for proof-of-work for generating and validating a block of a blockchain using at least one printing device shall be provided, which allows for increasing security for proof-of-work.

SUMMARY

This problem is addressed by a computer-implemented method for proof-of-work for generating and validating a block of a blockchain using at least one printing device and a uses with the features of the independent claims. Advantageous embodiments which might be realized in an isolated fashion or in any arbitrary combinations are listed in the dependent claims as well as throughout the specification.

In a first aspect of the present invention, a computer-implemented method for proof-of-work for generating and validating a block of a blockchain using at least one printing device is proposed. The printing device is configured for generating at least one digital image depending on a printer control setting.

The method comprises the following method steps which, specifically, may be performed in the given order. Still, a different order is also possible. It is further possible to perform two or more of the method steps fully or partially simultaneously. Further, one or more or even all of the method steps may be performed once or may be performed repeatedly, such as repeated once or several times. Further, the method may comprise additional method steps which are not listed.

The method comprises the following steps:

i) determining a plurality of number strings by solving at least one cryptographic puzzle;

ii) selecting one of the number strings of the determined plurality of number strings as mining printer control setting;

iii) printing at least one initial digital image comprising a plurality of colored pixels by using the printing device with the selected mining printer control setting and scanning the printed image by using at least one scanning device, thereby generating a mining digital image having a plurality of colored pixels different from the initial digital image;

iv) comparing the colored pixels of the mining digital image and a task digital image by using at least one processing device, wherein the task digital image comprises a plurality of colored pixels being different from the initial digital image.

The method further comprises repeating steps ii) to iv) until the colored pixels of the mining digital image and the task digital image are found to be identical. In each case in step ii) a different mining printer control setting is selected. The mining printer control setting for which the mining digital image and the task digital image are found to be identical, at least within tolerances, is used as the proof-of-work for generating and validating the block of the blockchain.

The term "computer-implemented" as used herein is a broad term and is to be given its ordinary and customary meaning to a person of ordinary skill in the art and is not to be limited to a special or customized meaning. The term specifically may refer, without limitation, to a process which is fully or partially implemented by using a data processing means, such as data processing means comprising at least one processor. The term "computer", thus, may generally refer to a device or to a combination or network of devices having at least one data processing means such as at least one processor. The computer, additionally, may comprise one or more further components, such as at least one of a data storage device, an electronic interface or a human-machine interface.

The term "block", as used herein is a broad term and is to be given its ordinary and customary meaning to a person of ordinary skill in the art and is not to be limited to a special or customized meaning. The term specifically may refer, without limitation, to a component or an element of the blockchain. Blockchains can be defined as a chain of blocks which can hold certain records and the blocks are linked to one another using the principles of cryptography, for further details see "Eshani et al, "A study on the issue of blockchain's energy consumption", Chapter 2, DOI: 10.1007/978-981-15-0361-0_5 or en.wikipedia.org/wiki/Blockchain. Each block may comprise transaction data. The blocks may be linked by comprising a hash value of the previous block. Each block may comprise a cryptographic hash of the previous block. Each block may further comprise a time-stamp. The blockchain may comprise a plurality of linked blocks.

The block may comprise a header comprising a plurality of fields. Specifically, the header comprises information about a block version number, a cryptographic hash of the previous block header, a cryptographic hash based on all of the transactions in the block, time, bits and the nonce. A structure of the block may be similar to block architecture of Bitcoin, e.g. as described in en.bitcoin.it/wiki/Block_hashing_algorithm. A block header may comprise these fields:

| Field | Size (Bytes) |
| --- | --- |
| Block version number | 4 |
| a cryptographic hash of the previous block header | 32 |
| a cryptographic hash based on all of the transactions in the block | 32 |
| Time | 4 |
| Bits | 4 |
| Nonce | 4 |

The fields block version number, also denoted as "Version", cryptographic hash of the previous block header, also denoted as "hashPrevBlock", cryptographic hash based on all of the transactions in the block, also denoted as "hashMerkleRoot", and "Time" may be generated in the same way as for Bitcoin and may keep the same meaning. The time may be a timestamp as seconds since 1970-01-01T00:00

UTC. The method may allow adjusting the time to protocol of transactions in each block. However, other times are possible.

The term "bits" as used herein is a broad term and is to be given its ordinary and customary meaning to a person of ordinary skill in the art and is not to be limited to a special or customized meaning. The bits may define a number of pixels of the initial digital image and/or the number of pixels of the task digital image. The field "bits", e.g. 32-bit "bits", may also be used to define the number of pixels of the task digital image. For example, the first 16 bits may be used to define the number of pixels of the initial digital image to be printed. The second 16 bits may be used to define the number of pixels of the task digital image. The field "bit" may define the mining difficulty. The field "Bits" may be used to address the difficulty and/or printing time by the number of pixels per each printing and scanning iteration. The larger the number of pixels to be printed, the longer is the printing time and the longer takes the iteration. Thus, the field bit may be used differently as for Bitcoin.

The term "generating a block" as used herein is a broad term and is to be given its ordinary and customary meaning to a person of ordinary skill in the art and is not to be limited to a special or customized meaning. The term specifically may refer, without limitation, to adding and/or producing and/or creating a new block to the blockchain. The term "proof-of-work" as used herein is a broad term and is to be given its ordinary and customary meaning to a person of ordinary skill in the art and is not to be limited to a special or customized meaning. The term specifically may refer, without limitation, to a consensus process for securing generation of new blocks of the blockchain. Before a block can be added to the blockchain, information contained by the block needs to be "validated" by a network built on blockchain technology, also denoted as blockchain network. This is may be done by creating a so-called hash by solving a cryptographic puzzle. The process of searching for the solution is usually called "mining" or "mining process". The nodes of the network may check if the found solution is correct. If the nodes confirm its validity, the block is considered validated and can be added to the blockchain.

The term "printing device", also denoted as printer, as used herein is a broad term and is to be given its ordinary and customary meaning to a person of ordinary skill in the art and is not to be limited to a special or customized meaning. The term specifically may refer, without limitation, to at least one device configured for applying, e.g. printing, at least one material onto at least one printing surface or substrate, specifically in a patterned fashion, according to the printer control setting. In particular, the printing device may comprise one or more of a drum, such as an image drum; a conveyor such as a transfer belt; a laser, a lens system, such as a lens system comprising at least one mirror, e.g. a rotatable mirror; a cleaning element, such as a roll, a scraper or similar means for cleaning, e.g. for cleaning the drum or the conveyer; a cassette, e.g. for storing one or more of the substrate, such as a paper cassette; at least one transporting element, such as a roller and/or conveyor, e.g. for feeding, transferring and/or ejecting the substrate, specifically the paper, into, within and/or from the printing device; a printer control unit configured for controlling the printing device. In particular, the material is printed on the surface of the drum, such as an image drum, or on the conveyer such as a transfer belt. For example, the printing device may comprise a cassette, e.g. for storing one or more of the substrate, such as a paper cassette; at least one transporting element, such as a roller and/or conveyor, e.g.

for feeding, transferring and/or ejecting the substrate, specifically the paper, into, within and/or from the printing device. The printing device may comprise at least one pigment collector configured for collecting pigments from the transfer belt. The printing device may comprise at least one suction mechanism for sucking the pigments from the transfer belt, e.g. into the pigment collector. Other embodiments for transferring the pigments from the transfer belt into the pigment collector may be feasible, e.g. without using a suction mechanism. The printing device may comprise at least one, e.g. further, suction mechanism for transferring the collected pigments from the pigment collector out of the printing device. This may allow to ensure a continuous 24-hours-7-days-a-week operation of the printing device and to avoid the manual emptying the pigment collector in case of being filled with pigments. The printing device may comprise at least one material storage configured for providing pigments for printing. The printing device may comprise at least one dosing mechanism. The dosing mechanism may be configured for transferring pigments from the material storage for printing, e.g. into the printing device. This may allow to ensure a continuous 24-hours-7-days-a-week operation of the printing device and to avoid the manual recharge of the pigment reservoirs in the printing device in case of the pigment reservoirs running out of pigments.

The printing device is configured for generating the at least one digital image. The digital image may be derived from scanning the optical impression of at least one material on the substrate applying an illumination on the scanned area. The term "digital image", also denoted digital picture, as used herein is a broad term and is to be given its ordinary and customary meaning to a person of ordinary skill in the art and is not to be limited to a special or customized meaning. The term specifically may refer, without limitation, to a two-dimensional representation of a physical object. The terms image and picture are used in the following as synonyms. The digital image may comprise a plurality of colored pixels. For example, the digital image may be a digital RGB image. The digital RGB image may be a color digital image having three color channels, i.e. one for red (R), one for green (G) and one blue (B). The primary colors of the digital RGB image may be red, green and blue. The RGB digital image may have a color channel for each primary color. The digital color image may comprise a plurality of image pixels, wherein each image pixel is made of combinations of the primary colors. For example, the digital RGB image may be 24-bit or 48-bit. Each pixel of the digital RGB image may be specified by two spatial coordinates and three color values. For example, the digital image may be a digital CMYK color image, wherein the primary colors of the CMYK color space are black, cyan, magenta, yellow and white. However, other color spaces are possible.

The printing may comprise printing the image on a transfer belt, also denoted as drum herein, in the printing device.

The term "printer control setting" as used herein is a broad term and is to be given its ordinary and customary meaning to a person of ordinary skill in the art and is not to be limited to a special or customized meaning. The term specifically may refer, without limitation, to printer control information comprising a plurality of parameters for controlling at least one function of the printing device. For example, the printer control setting may comprise a string of characters of a predefined length. The printer control setting may comprise at least one item of blending information, which will be outlined in more detail below. Thus, typically, the printing device may be configured for generating text and/or images on the at least one printing surface according to the printer control setting, such as one or more of a string of characters, a bitmapped image, a vector image, a computer program, e.g. provided in at least one printer control language. In particular, the printing device, specifically at least one function of the printing device, may be controllable via at least one printer control language, such as one or more page description languages (PDLs), printer command languages (PCLs), PostScript, XML Paper Specification and the like.

As outlined above, step i) comprises determining a plurality of number strings by solving at least one cryptographic puzzle. The number strings may be potential mining printer control settings for transferring and/or generating a task digital image from an initial digital image. In step ii) one number string of the determined plurality of number strings is selected as mining printer control setting. The term "mining printer control setting" as used herein is a broad term and is to be given its ordinary and customary meaning to a person of ordinary skill in the art and is not to be limited to a special or customized meaning. The term specifically may refer, without limitation, to the printer control setting assumed to be used for transferring and/or generating the task digital image from the initial digital image.

The term "cryptographic puzzle" as used herein is a broad term and is to be given its ordinary and customary meaning to a person of ordinary skill in the art and is not to be limited to a special or customized meaning. The term specifically may refer, without limitation, to an arbitrary mathematical task having a defined difficulty. Solving the cryptographic puzzle may comprises finding numerals which generate a cryptographic hash value, also denoted as hash value, having a defined number of leading numerals. The leading numerals may be defined. For example, the numerals are identical. For example, an input for the cryptographic puzzle may be the transactions in the block. For example, a current block's version number, the data stored in the block and the hash value of the previous block may be used as input for the hash function. The difficulty to control the average time duration for generating a block may be adjusted according to the computing power of the network of involved mining computers. The difficulty, e.g., is set by the number of leading numerals of the hash value. The number of leading numerals of the hash value may be fixedly defined such as may be set to a number and/or may be defined automatically e.g. by using at least one difficulty algorithm. The latter may comprise re-defining and/or adjusting the number of leading numerals, such as after a defined number of generated blocks. For example, the number of leading numerals may be re-defined and/or adjusted every 2016 blocks. The number of the leading numerals may be re-defined and/or adjusted depending on an average time duration for generating a block, e.g. 10 minutes. The numeral may be a symbol, or group of symbols denoting a number, e.g. a number string, a hexadecimal numeral and the like. Specifically, the numerals are potential nonces. The term "nonce", as used herein is a broad term and is to be given its ordinary and customary meaning to a person of ordinary skill in the art and is not to be limited to a special or customized meaning. The term specifically may refer, without limitation, to an arbitrary numeral that can only be used once (1-dimensional). One of the found nonces may be the printer control setting configured for transferring of the initial digital image into the task digital image. Specifically, one of the nonces may be the mining printer control setting which transfers the initial digital image into a task digital image, in particular after one or more of printing, scanning, and pixelation. For example, the cryptographic hash value comprises hexadecimal numerals. Solving the cryptographic puzzle may comprise finding hexadecimal numerals which generate a cryptographic hash value having a defined number of leading hexadecimal numerals, e.g. ten leading zeros. For example, step i) may comprise solving a cryptographic puzzle thereby finding nonces, which are added to the hexadecimal numerals of a header of the block to generate certain hash values of e.g., certain number of "zeros".

The cryptographic hash value may be generated by using at least one hash function having a block number of the block, data stored in the block and the cryptographic hash of a previous block as input. The hash function may be an arbitrary function that can be used to map data of arbitrary size to fixed-size values. The values returned by a hash function are called hash values. The term "cryptographic hash value" as used herein is a broad term and is to be given its ordinary and customary meaning to a person of ordinary skill in the art and is not to be limited to a special or customized meaning. The term specifically may refer, without limitation, to a numeric value of a fixed length which uniquely representing data. For example, the cryptographic hash value may comprise hexadecimal numerals. The term "data" as used herein is a broad term and is to be given its ordinary and customary meaning to a person of ordinary skill in the art and is not to be limited to a special or customized meaning. The term specifically may refer, without limitation, to information and/or to machine-readable signals or symbols representative for information. The data specifically may be or may comprise one or both of digital data and analogue data. For example, the hash function may be at least one secure hash function SHA-2 selected from the group consisting of SHA-224, SHA-256, SHA-384, SHA-512, SHA-512/224, SHA-512/256. For example, a current block's version number, the data stored in the block (including the nonce) and the hash value of the previous block may be used as input for the hash function.

Step ii), as outlined above, comprises selecting one of the number strings of the determined plurality of number strings as mining printer control setting. Specifically, the method comprises applying the found numerals as mining printer control settings and checking, if one of the mining control settings transfers the initial digital image into the task digital image. The mining printer control setting may be selected iteratively. The mining printer control setting found to transfer the initial digital image into the task digital image is used for generating a numeral to be applied as nonce for generating and validating the block of the blockchain, also denoted as consensus mechanism.

As outlined above, step iii) comprises printing at least one initial digital image comprising a plurality of colored pixels by using the printing device with the selected mining printer control setting and scanning the printed image by using at least one scanning device, thereby generating a mining digital image having a plurality of colored pixels different from the initial digital image.

A size of the nonce may be set before printing. For example, the size of the nonce may be set by an information defining color intensities of each color of the color space used for printing. For example, the intensity of each color of a color space, e.g. the CMYK color space, can be varied from 0-255. Thus, a structure of the nonce may be {CC-MM-YY-KK}. For example, the size of the nonce is 4 bytes to define an intensity of colors of a color space in the range of 0 to 255. Specifically, the size of the nonce is 4 bytes to define an intensity of four colors of the color space in the range of 0 to 255. For example, the size of the nonce is 4 bytes to define an intensity of colors in the range of 0 to 15 for a color space of eight colors, or in the range of 0 to 255 for a color space of four colors or in an appropriate range for further colors of further color spaces, wherein the intensity of color is expressed by one or two hexadecimal numerals or by other numerals as, for example, decimal numerals for each pigment color. The intensity may be expressed by two hexadecimal numerals for each color.

The method further may comprise generating the initial digital image by converting at least one part of a cryptographic hash of a previous block header into color values of the colored pixels. The term "generating at least one initial digital image" as used herein is a broad term and is to be given its ordinary and customary meaning to a person of ordinary skill in the art and is not to be limited to a special or customized meaning. The term specifically may refer, without limitation, to a process of determining the color of pixels of the initial digital image. The term "initial digital image" as used herein is a broad term and is to be given its ordinary and customary meaning to a person of ordinary skill in the art and is not to be limited to a special or customized meaning. The term specifically may refer, without limitation, to an arbitrary digital image used as a starting point for mining. The initial digital image may be generated by converting at least one part of the cryptographic hash value of a previous block header into color values of the colored pixels of the initial digital image. For example, the generation of initial digital image may comprise converting at least one part of the hexadecimal numerals of the cryptographic hash value of a previous block header in to RGB colors to print the initial digital image on a substrate using pigment particles according to a further color space, e.g. the CMYK color space. For example, the conversion of the hexadecimal numerals into color values may be performed using at least one mathematical algorithm and/or at least one pre-determined relationship such as a look-up table, e.g. as described in www.rapidtables.com/convert/color/hex-to-rgb.html, or "The Image-Interface: Graphical Supports for Visual Information", Everardo Reyes-Garcia, John Wiley & Sons, 2017, ISBN 978-1-1194-7497-5.

The generating of the initial digital image may comprise selecting hexadecimal numerals from the cryptographic hash value of a previous block header. For example, the cryptographic hash value may be used as comprised in the block's header. For example, for a first pixel of the initial digital image the first six digits of the hexadecimal numerals may be selected and converted into an RGB color. For the further pixels of the initial digital image consecutively the next six digits may be selected and converted into RGB colors. However, other embodiments for selecting hexadecimal numerals from the cryptographic hash are possible. For example, the cryptographic hash value of a previous block header may be processed e.g. by sorting and/or at least one further mathematical algorithm. For example, the method may comprise generating for each pixel of the initial digital image a table comprising rows and columns. Each row may comprise a differently processed version of the initially cryptographic hash value. For example, for a first pixel of the initial digital image the numerals of the first six rows of the first column may be selected. For the further pixels of the initial digital image consecutively the next rows and/or columns may be selected.

The generating of the initial digital image may comprise converting hexadecimal numerals of the cryptographic hash value of a previous block header into RGB colors of significant optical differences. The term "significant optical differences" as used herein is a broad term and is to be given its ordinary and customary meaning to a person of ordinary skill in the art and is not to be limited to a special or customized meaning. E.g., the conversion of the hexadecimal numerals of the cryptographic hash value into RGB colors of significant optical differences may be done according to a predefined lookup table (illustratively done for 4-bit color space):

| hexadecimal numeral of the cryptographic hash | hexadecimal code of RGB color | Appearance of RGB color |
| --- | --- | --- |
| 0 | FFFFFF | white |
| 1 | FFFFC0 | lemon yellow |
| 2 | FFFF00 | yellow |
| 3 | C0FFC0 | mint |
| 4 | 40FF00 | lawn green |
| 5 | 00C000 | lemon green |
| 6 | C0FFFF | pale turquoise |
| 7 | 00FFFF | cyan |
| 8 | 00C0C0 | dark turquoise |
| 9 | 807FFF | light purpe |
| a | 0000FF | blue |
| b | FFD0FF | lavender |
| c | FF00FF | pink |
| d | C060C0 | purple |
| e | FF4040 | red |
| f | 000000 | black |

The RGB color space may be a 24 bit color space. An RGB color palette may comprise $(2^8)^3$ colors. In order to achieve significant optical differences, only two hexadecimal numerals may be used for defining the respective RGB color.

The cryptographic hash value of a previous block header may be used to define a size and/or shape of the pixels of the initial digital image before printing on the substrate. The hexadecimal numerals of the cryptographic hash value of a previous block header is preferably used to define the amount of color dots per pixel. The hexadecimal numerals of the cryptographic hash value of a previous block header may be used to define the amount of color dots per pixel. The method may comprise generating for each pixel of the initial digital image a table comprising rows and columns. Each row may comprise a differently processed version of the initially cryptographic hash value. For example, the size of the first pixel of the initial digital image may be defined by a seventh row of the first column. For the further pixels of the initial digital image consecutively the next seventh rows and/or columns may be selected. The shape of the pixel may be defined by a part of the cryptographic hash value. For example, the seventh row may be used for the shape, too, and/or another row may be used for defining the shape. For example, the pixel may be circular-shaped for numerals between 0 and 4; triangle-shaped for numerals between 5-8; square-shaped for numerals between 9 and B and/or rhombus-shaped for numerals between C and F. However, other embodiments are feasible. The method may comprise arranging the pixels in a quadratic format. An area size of each pixel may be set to 10 mm×10 mm, preferably 3 mm×3 mm.

The term "task digital image" as used herein is a broad term and is to be given its ordinary and customary meaning to a person of ordinary skill in the art and is not to be limited to a special or customized meaning. The term specifically may refer, without limitation, to an arbitrary digital image used as cryptographic puzzle. The task digital image comprises a plurality of colored pixels different from the initial digital image. The colored pixels of the task digital image may have identical or different color values. The colored pixels of the initial digital image and/or the task digital image may be colored pixels of the RGB color space.

The task digital image may be generated by converting at least one part other than used for generating the initial digital image of the cryptographic hash value of a previous block header into at least one color value of the colored pixels. With respect to converting at least one part of the cryptographic hash value into color values for the pixels of the task digital image reference is made to the generating of the initial digital image. However, for the task digital image a part of the cryptographic hash value other than for the initial digital image may be used. However, other color spaces may be possible. For example, for mining, first the RGB color of the task digital image may be defined automatically. For this, e.g. the last 24 bits of the cryptographic hash of the previous block may be taken.

Additionally or alternatively, the task digital image may be generated by using at least one random algorithm. Such random algorithms are generally known to the skilled person. The random numbers such as hexadecimal numbers generated by the random algorithm may be converted into color values. The conversion of the hexadecimal numerals into the color values may be performed using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/.

Additionally or alternatively, the task digital image may be provided by transforming digital information of transaction of a block, such as of the block to be added or of a previous block, in color values, e.g. in RGB colors or CMYK colors. The transaction may comprise financial transactions such as payments, licensing, orders, invoices, and/or logistic transactions such as deliveries, storage records, travel records, and/or transactions relating to plans, and/or tax declarations, and/or contracts, and/or personal health information and the like. The term "digital information of transaction" as used herein is a broad term and is to be given its ordinary and customary meaning to a person of ordinary skill in the art and is not to be limited to a special or customized meaning. The term specifically may refer, without limitation, to data describing at least one transaction, also denoted as transaction data. The transaction data may comprise information about one or more of time of transaction, a numerical value of the transaction a text of the transaction, a digital picture of the transaction, a text of the transaction, a digital image of the transaction and the like. The transaction data may be provided in binary format.

The mining proposed by the present invention is about finding the mining printer control setting of the plurality of potential mining printer control settings transferring the initial digital image into the task digital image. The miners compete to find, firstly, the plurality of potential mining printer control settings by solving the cryptographic puzzle and, subsequently, identifying the mining printer control setting number of the plurality of potential mining printer control settings, which converts the initial digital image into the task digital image. The miner, who has found the mining printer control setting transferring the initial digital image into the task digital image first may be awarded. The other miners may check the mining printer control setting.

The mining digital image has a plurality of colored pixels different from the initial digital image. The colored pixels of the mining digital image may be colored pixels of CMYK or RGB colors space. In the 24-bit RGB colors space, the difference of the color code between the mining digital image and the initial digital image may be one for one of the three colors of the RGB colors space for one pixel (e.g., the color codes of the pixels of the initial digital image and the mining digital image are the same, but for one pixel the color code of the mining digital image is 4472C5 and for the same pixel of the initial digital image the color code is 4472C4).

The term "mining digital image" as used herein is a broad term and is to be given its ordinary and customary meaning to a person of ordinary skill in the art and is not to be limited to a special or customized meaning. The term specifically may refer, without limitation, to a digital image being generated by printing the initial digital image using the printing device by blending and/or mixing pigments with the selected mining printer control setting and scanning the printed image by using at least one scanning device. The printing may comprise printing on a substrate. The blending may comprise at least one process of mixing pigments in a defined manner, thereby creating a blend. The printing device may be configured for use as a blending device. Specifically, the printing device is configured for receiving the at least one item of blending information and for generating the printing digital image.

The printing device may specifically be configured for blending at least two materials according to the at least one item of blending information onto at least one substrate. In particular, the printing device may be configured for blending the at least two materials according to the item of blending information, thereby e.g. generating the blend, onto a substrate for receiving the blend. With respect to embodiments of the printing device and the scanning device reference is made to WO 2021/001147, the full content is included herein by reference. The term "material" as used herein is a broad term and is to be given its ordinary and customary meaning to a person of ordinary skill in the art and is not to be limited to a special or customized meaning. The term specifically may refer, without limitation, to a chemical element or a chemical compound, specifically a chemical element or a chemical compound being capable of mixing with other chemical elements or chemical compounds. The material specifically may be suitable for pouring. The material generally may be in one or more of a solid state, specifically a granular solid state, a liquid state or a gaseous state. Specifically, the material may be or may comprise at least one of a powder or a liquid. The material may be a homogeneous, unitary material. Alternatively, the material may also comprise a plurality of components which are mixed homogeneously or inhomogeneously. Thus, the material may be a mixture or a composite by itself. As an example, the material may be or may comprise a liquid, wherein the liquid, as an example, comprise at least one solvent and at least one chemical compound dissolved, emulsified or dispersed in the at least one solvent. The solvent may form part of the material, or, alternatively, the at least one chemical compound may be considered the material, whereas the solvent may simply be considered as an adjuvant or additive to the material.

The term "blending" as used herein is a broad term and is to be given its ordinary and customary meaning to a person of ordinary skill in the art and is not to be limited to a special or customized meaning. The term specifically may refer, without limitation, to the process of mixing the at least two materials in a defined manner, thereby creating a blend. The terms blending and mixing will be used interchangeable herein. The process of creating the blend may include further steps such as temperature changes or temperature treatments of the at least two materials. The mixing take place in various ways, in accordance with the nature of the at least two materials. As an example, in case the at least two materials comprise powders, the mixing may involve co-dispensing or subsequently dispensing the powders into a common receptacle, including the option of stirring the mixture. Additionally or alternatively, in case the at least two materials comprise liquids, the mixing may also involve co-dispensing or subsequently dispensing the liquids into a common receptacle, including the option of stirring the mixture. Additionally or alternatively, as will be outlined in further detail below, the mixing may also comprise printing processes, e.g. inkjet printing of the at least two materials, e.g. onto a common substrate. Additionally or alternatively, the blending may comprise other types of mixing processes of the at least two materials, such as mixing the at least two materials on at least one common substrate. As an example, the blending may comprise one or more electrostatic precipitation processes, such as electrostatic precipitation of the at least two materials, e.g. onto a common substrate, e.g. onto an electrostatic charged surface. Thus, specifically, the blending and/or mixing may comprise electrostatic precipitation in printing processes. For example, the blending and/or mixing may comprise electrostatic precipitation in printing processes of at least two electrostatic charged materials onto an electrostatic neutralized surface. Thus, the materials may be mixed, thereby at least temporarily changing their electrical charges. Specifically, the blending and/or mixing may comprise electrostatic precipitation in laser printing processes, such as processes typically performed in a laser printer. In particular, the at least two materials, e.g. the pigments, may for example firstly be electrostatically charged and deposited on an equally charged image roll where specific areas have been electrostatically neutralized, e.g. by using a laser and/or LED. These deposited materials may, as an example, then be drawn and/or removed off the image roll by a reversely charged substrate, such as by a reversely charged paper.

The blending may leave the materials unchanged or may also fully or partially change the nature of the materials. Thus, as an example, the materials may simply be mixed without any chemical changes. Additionally or alternatively, the materials may be mixed, thereby changing their chemical nature. The latter specifically may take place in case the materials contain solvents which, during the blending or afterwards, may fully or partially evaporate. Again, additionally or alternatively, the materials may also fully or partially react with each other, thereby generating at least one reaction product.

The term "blend" as used herein is a broad term and is to be given its ordinary and customary meaning to a person of ordinary skill in the art and is not to be limited to a special or customized meaning. The term specifically may refer, without limitation, to a mixture of the at least two materials. The mixture specifically may be present in at least one receptacle and/or on at least one substrate. The mixture generally may be in one or more of a solid state, specifically a granular solid state, a liquid state or a gaseous state. Specifically, the mixture may be or may comprise at least one of a powder or a liquid. The mixture may be in the same state as the materials or may be in a different state. As an example, at least one of the materials may be in a liquid state, wherein the mixture may also be in a solid state, which may be the case e.g. after a drying process. Thus, as an example, the at least two materials may be mixed in the blending process in a liquid state, wherein, afterwards, a drying may take place, thereby evaporating at least one solvent and/or thereby changing the chemical nature of the mixed materials. As an example, the mixing process may imply a printing of the at least two materials in a liquid state onto at least one substrate, followed by a drying or setting process, wherein the blend, consequently, may be in a dried or solid state. Other examples may imply a phase change process, such as a curing or a solidifying of the materials after mixture.

The term "item of blending information" as used herein is a broad term and is to be given its ordinary and customary meaning to a person of ordinary skill in the art and is not to be limited to a special or customized meaning. The term specifically may refer, without limitation, to at least one item of information describing a defined blending process. The at least one item of blending information may refer to the process of blending itself, such as to the way the at least two materials are mixed, e.g. to process parameters of the mixing process. Additionally or alternatively, the at least one item of blending information may also refer to the materials for blending, such as to quantities to be mixed in the blending process, e.g. to masses or volumes of the materials.

The term "blending device" as used herein is a broad term and is to be given its ordinary and customary meaning to a person of ordinary skill in the art and is not to be limited to a special or customized meaning. The term specifically may refer, without limitation, to a device which is configured for performing the above described blending process. Specifically, as will also be outlined in further detail below, the blending device may comprise at least one of a feed or a reservoir for each of the materials. The blending device may also comprise at least one blending element, such as at least one of a nozzle, a stirring device, a printer, a mixer or the like.

Consequently, the term "blend" as used herein is also a broad term and is to be given its ordinary and customary meaning to a person of ordinary skill in the art and is not to be limited to a special or customized meaning. The term specifically may refer, without limitation, to a mixture of at least two materials. The blend specifically may be present on a substrate or in a receptacle. The blend specifically may comprise a finite amount of the materials.

The generating of the mining digital image may comprise detecting at least one material property of the blend by using at least one detector. The term "material property" as used herein is a broad term and is to be given its ordinary and customary meaning to a person of ordinary skill in the art and is not to be limited to a special or customized meaning. The term specifically may refer, without limitation, to an arbitrary property of a material, such as of the blend. The property specifically may refer to one or more of a physical, a chemical or a biological property. Specifically, the material property may comprise at least one of a mechanical property or an optical property of the material. The material property specifically may refer to a measurable property of the respective material. More specifically, the at least one material property may be or may comprise at least one color of the blend. Additionally or alternatively the at least one property selected from the group consisting of: a specific density of the blend; a volume of the blend; a weight of the blend; an optical property of the blend; a spectral composition of the blend, specifically a color spectrum of the blend; a color intensity of the blend; a viscosity of the blend. Other material properties may be used alternatively or additionally.

The step of detecting the at least one material property of the blend specifically may comprise generating at least one item of measurement information on the material property. Thus, the at least one item of measurement information may generally refer to the result of a measurement of the at least one material property, such as to at least one numerical measurement value indicating the at least one material property of the blend or being characteristic for the at least one material property of the blend. Thus, as an example, the at least one item of measurement information may, as an example, comprise at least one of the following items of information: a specific density measurement value of the blend; a volume measurement value of the blend; a weight measurement value of the blend; an optical property measurement value of the blend; a color measurement value of the blend; a spectral composition measurement value of the blend, specifically a color spectrum measurement value of the blend; a color intensity measurement value of the blend; a viscosity measurement value of the blend. These measurement values might as an example each may be or may comprise a single number or a plurality of numbers, such as distributions, spectra or the like. Specifically, the at least one item of measurement information may be or may comprise at least one numerical value such as a digital value.

The term "detecting" as used herein is a broad term and is to be given its ordinary and customary meaning to a person of ordinary skill in the art and is not to be limited to a special or customized meaning. The term specifically may refer, without limitation, to the process of generating information on a property or measurable variable, wherein qualitative and/or quantitative information may be retrieved. The term specifically may refer to the process of measuring at least one measurable variable of the physical object. Consequently, the term "detector" as used herein is a broad term and is to be given its ordinary and customary meaning to a person of ordinary skill in the art and is not to be limited to a special or customized meaning. The term specifically may refer, without limitation, to an arbitrary device configured for performing the detecting process, such as a device having at least one sensor for measuring the at least one measurable variable of the object. As an example, the sensor may comprise one or more of: a weight sensor, specifically a scale; a volume sensor; a density sensor; a color sensor; a particle size distribution sensor. Other sensors may be used in addition or alternatively.

The at least one item of blending information specifically may comprise n blending variables, wherein n denotes a positive integer. The term "blending variable" as used herein is a broad term and is to be given its ordinary and customary meaning to a person of ordinary skill in the art and is not to be limited to a special or customized meaning. The term specifically may refer, without limitation, to a variable which either quantitatively or qualitatively describes at least one aspect or parameter of the blending. As an example, the blending variable may refer to the at least two materials, to detect of the blending process such as quantities or material streams for mixture or the like. Further, m material properties of the blend may be detected, with m being a positive integer. Specifically, the number m of material properties detected may be as large or larger than the number n of blending variables. In other words, preferably, m ≥ n. In still other words, specifically, the information generated by the detection may be at least as large as the information used for the generating of the blend, wherein the term "information" may refer to the numbers n and m, respectively, and/or may generally refer to the number of degrees of freedom and/or to the logarithm of the degrees of freedom, such as log n or log m, respectively.

The at least two materials blended specifically may be different materials, specifically materials being different with respect to at least one property selected from the group consisting of: a chemical property, specifically a chemical composition; an optical property, specifically an optical appearance such as one or more of a color, a transparency, a brilliance; a mechanical property, specifically one or more of granularity, particle size, density, viscosity or flowing properties; an electrostatic chargeability; a compressibility; a crystallinity; a particle shape. Still, additionally or alternatively, other properties may be used.

The at least two materials specifically may comprise bulk materials and/or loose materials. The at least two materials, independently, each may be selected from the group consisting of solid materials, gaseous materials and liquid materials. More specifically, the at least two materials, independently, may be selected from the group consisting of and/or may comprise at least two materials selected from the group consisting of:

- a powder, specifically a powder selected from the group consisting of:
  - an inorganic powder, specifically an inorganic powder made of a mineral;
  - an organic powder, specifically an organic powder made of a polymer;
  - a pigment;
  - a toner powder;
- a liquid, specifically a liquid selected from the group consisting of a pure liquid, a suspension, an emulsion or a solution, more specifically one or more of a liquid color and an ink.

The term material and pigment may be used herein as synonyms. Thus, the term pigment may comprise a color particle, a powder, a liquid comprising these particles. The term pigment may comprise pure pigments and/or pigments having at least one polymer coating, e.g. of styrene acrylate copolymer, polyester resin, styrene butadiene copolymer, or similar polymers. Specifically, the term pigment may refer to toner powders. In the context of the present invention, any suitable pigment can be used. It is also possible to use mixtures, e.g. comprising one or more pigments or toner powders of one or more pigments in the context of the present invention.

In the context of the present invention, the amount of the pigments used may vary. Preferably, the amount of pigments used is in the range of from $10^{-15}$ g/cm$^2$ to 1 g/cm$^2$, more preferable in the range of from $10^{-9}$ g/cm$^2$ to $10^{-3}$ g/cm$^2$.

The particle size of the pigments used preferably is in the range of from 10 nanometer to 1 mm, preferably, in particular in the range of from 100 nanometer to 100 micrometer.

Preferably, suitable pigments are selected from inorganic materials, preferably from metal oxides, metal oxides, preferably metal oxides from natural sources. Suitable may for example be pigments selected from iron oxides. Iron oxide pigments are relatively low-cost materials that resist color change due to exposure to sunlight, have good chemical resistance and are stable under normal ambient conditions. It has been found that iron oxides are particularly suitable since the materials can easily be recycled and reused. Iron oxide pigments can for example be collected and can be used as feedstock for steel production leading to the avoidance of disposal of used pigment as waste.

Suitable iron oxides are also available as natural pigments. Suitable red pigments may be derived from hematite, yellow and brown pigments, such as ochres, sierras and umbers, may be derived from limonite, and magnetite provides a black iron oxide pigment. Furthermore, synthetic pigments, in particular metal oxides such as iron oxides, which are manufactured under controlled conditions such that particle size, distribution and shape resulting in superior uniformity, may be used according to the present invention to improve color quality and chemical purity.

For example, pigments from natural sources are suitable for the method of the present invention such as pigments selected from natural organic materials, for example organic material from plants, animals, and minerals. Also suitable are pigments selected from synthetic organic materials such as for example azopigments. Suitable mineral pigments are for example ochre, sienna, azurite, cobalt or ultramarine. Also spinels may be used. Ochre is usually a red or yellow that is obtained from ore of iron or ferruginous clay. Sienna is a form of limonite clay that is derived from ferric oxides to produce a rich red. Azurite is found in the upper oxidized portions of copper ore deposits. Ultramarine can be obtained from lapis lazuli or can be artificially manufactured. Spinels are available in yellow, orange, turquoise, and blue. Further examples include: carmine lake natural red 4 (cochineal), natural yellow 3 lake (from plants), madder lake natural red 9 (madder root), indigo lake natural blue 2 (woad), chlorophylin green lake (plant matter), vegetable or bone black, titanium white, iron oxides, talc, chalk, kaolin and other earth pigments.

According to a further embodiment of the present invention, preferably at least 20%, more preferably 30%, and most preferably 40%, of the pigments used should be of natural origin, i.e. derived from natural products, other than products of the petrochemical industry, by simple separation or purification steps. Other embodiments are possible, too. For example, 100% of the pigments used can be of natural origin.

In the context of the present invention the term pigments also comprises pigments which are visible under UV light. Sustainable and eco friendly materials may be used such as pigments from Clariant available under the Ecotrain label, for example pigments selected from the group of Novoperm Yellow HR 72, Hostaperm Blue B2G 03, Hostaperm Green GNX 01, Hansa Brilliant Yellow 2GX 72-S, Hostaperm Yellow H3G EDW VP 5131, https://www.clariant.com/de/Solutions/Products/2014/10/14/10/39/Novoperm-Orange-HL-71" \o "Novoperm Orange HL 71, and Hostaperm Blue B2G-EDS VP 3491.

In the context of the present invention, it is also possible to use effect pigments such as for example absorption pigments, metal effect pigments, and pearlescent pigments. Metal effect pigments or metallic effect pigments usually consist of flakes or platelets of aluminum, copper, copper-zinc alloys, zinc and other metals. Suitable pearlescent pigments are for example mica-based pigments, but also pigments based on silica or alumina flakes. Suitable are for example pigments of natural mica coated with thin films of metal oxides such as TiO$_2$ or iron oxide. Furthermore, pigments based on silica flakes (SiO$_2$) or alumina (Al$_2$O$_3$) based pigments can be used in the context of the invention. Suitable substrate-free pearlescent pigments are for example natural pearl essence, basic lead carbonate, bismuth oxychloride, micaceous iron oxide and TiO$_2$ flakes.

In particular the energy consumption can be enhanced if the pigments described above, such as "natural pigments", are used which do not require the energy input to perform the chemical synthesis. Using natural pigments in a printer may reduce the electrical energy consumption by 99% compared to publicly available data for the Bitcoin blockchain technology, see publications above. Thus, the present invention provides a significant contribution to reduce costs and CO$_2$ emission.

The blending of the at least two materials may be performed according to at least one item of blending information. The at least one item of blending information specifically may comprise at least one of: quantities for the at least two materials to be blended; weights for the at least two materials to be blended; volumes of the at least two materials to be blended; a blending ratio of volumes of the at least two materials to be blended; a blending ratio of weights of the at least two materials to be blended; mixing instructions for mixing two or more continuous or discontinuous streams of the at least two materials to be blended; printing instructions for blending the at least two materials to be blended, such as a tilting information for blending the at least two materials to be blended using differently tilted raster images, e.g. raster images generated by a raster image processor (RIP) of a printer. Still, additionally or alternatively, other types of blending information may also be used.

The at least two materials may be fed into the blending device continuously or discontinuously. Thus, as an example, the blending device may comprise at least two reservoirs for the at least two materials to be blended. Additionally or alternatively, however, other means of feeding the materials into the at least one blending device are also possible. Thus, as an example, a continuous feeding is also possible, in addition or alternatively to using at least one reservoir for at least one of the materials.

The blending device may further comprise at least one receiving element for receiving the blend. As used herein, the term "receiving element" may generally refer to an arbitrary element configured for receiving the blend. The receiving element specifically may have at least one receiving surface and/or at least one receiving material for receiving the blend. Thus, as an example, the at least one receiving element specifically may comprise at least one element selected from the group consisting of: a receiving vessel for receiving the blend; a substrate for receiving the blend. The at least one receiving element may be a stationary receiving element and/or maybe a moving receiving element, such as a rotatable receiving element. As an example, the receiving element may comprise at least one substrate, such as a substrate having at least one substrate surface which may be or may comprise a planar substrate surface and/or which may be or may comprise a curved substrate surface. As an example, the receiving element may comprise at least one drum having a receiving surface for receiving the blend, such as a rotating drum. The blend, by using the blending device, specifically may be deposited directly or indirectly on to the rotating drum. As an example, a drum may be used on which the blend is temporarily secured, such as electrostatically. These electrostatic drums are generally known in the technical field of printing, such as laser printing.

In case the receiving element comprises at least one drum, the drum specifically may be a rotating drum. Therein, the method may further comprise at least one cleaning step in which, after detecting the at least one material property, the blend specifically may be removed from the receiving surface of the drum. As an example, powders and/or pigments may be dispensed onto a rotating drum and may be, as an example, temporarily secured to the surface of the rotating drum by electrostatic forces. During that time of securing the blend to the surface of the rotating drum, the at least one material property of the blend on the surface might be detected, e.g. by optical reading. As an example and as will be outlined in further detail below, colors may be detected and, subsequently, may, as an example, be transformed into binary information, such as a binary row of numbers. Subsequently, the drum may be cleaned, such as by rotating into a cleaning position, e.g. by rotating the drum by 90°.

A similar procedure, optionally without the securing by electrostatic forces, may also be performed by using inkjet printing, either directly onto the surface of a drum and/or onto a moving substrate, such as onto a paper substrate. The drum, after detecting the at least one property, may be cleaned for reuse. Thus, as an example, the blending device may comprise at least one inkjet printer. The materials may be or may comprise inkjet printing of the materials, which may be or may comprise liquid materials, onto the at least one receiving element, such as onto the at least one rotating drum and/or onto at least one substrate. Subsequently, the detection of the at least one material property may take place, such as of the at least one optical property, e.g. by optical reading. As an example, again, colors may be detected and, subsequently, may, as an example, be transformed into binary information, such as a binary row of numbers. Subsequently, the drum may be cleaned, such as by rotating into a cleaning position, e.g. by rotating the drum by 90°. Additionally or alternatively, besides cleaning the at least one receiving element, a new receiving element or a new part of the receiving element may be used for further steps, such as for further printing and for repeating the blending and the detecting.

The blending device specifically may comprise at least one blending element for generating the blend. The term "blending element" as used herein is a broad term and is to be given its ordinary and customary meaning to a person of ordinary skill in the art and is not to be limited to a special or customized meaning. The term specifically may refer, without limitation, to an arbitrary element, device or combination of elements configured for blending the at least two materials, specifically by mixing the at least two materials, e.g. before, during or after deposition onto the at least one optional receiving element. As an example, the at least one blending element may be or may comprise at least one element selected from the group consisting of: a dispenser for continuously or discontinuously dispensing at least one of the two materials; a printer for printing the at least two materials onto at least one receiving element, specifically onto at least one substrate, specifically at least one printer selected from the group consisting of: an inkjet printer, a laser printer. Still, additionally or alternatively, other types of blending elements may be used. Thus, as an example, the blending element may be or may comprise at least one of a stirring element, a dispenser, a nozzle, an extruder.

The printer may specifically be configured for blending the at least two materials according to the at least one item of blending information onto at least one substrate. In particular, the printer may be configured for blending the at least two materials according to the item of blending information, thereby e.g. generating the blend, onto a substrate for receiving the blend. The substrate may specifically be or may comprise at least one carrier medium, such as a carrier medium selected from the group consisting of: a glass carrier, such as a glass plate or a glass sheet; a plastic carrier, such as a plastic plate or a plastic sheet; a paper carrier, such as a paper sheet; a canvas. Other substrates may be feasible. As an example, the substrate may be a part of the printer itself or may be embedded within the printer. In particular, the substrate comprised by the printer may be a reusable carrier medium, such as a medium having a cleanable surface, e.g. a drum of the printer, for example a rotating drum.

The printer may further be configured for blending the at least two materials such that at least one pattern, specifically at least one interference pattern, is generated. The at least two materials to be blended by the printer may in particular be different materials, specifically materials being different with respect to at least one property. As an example, the at least two materials to be blended by the printer may differ in at least one property selected from the group consisting of: a chemical property, specifically a chemical composition; an optical property, specifically an optical appearance such as one or more of a color, a transparency, a brilliance; a mechanical property, specifically one or more of granularity, particle size, density, viscosity or flowing properties; an electrostatic chargeability; a compressibility; a crystallinity; a particle shape.

The method may comprise transforming the detected material property into color values of pixels for generating the mining digital image. The transforming may be performed by using at least one data processing device configured for applying at least one transformation algorithm to the material property. The transforming of the at least one material property into color values may take place in a computer-implemented fashion. Thus, the transforming of the at least one material property into the color values takes place by using at least one data processing device configured for applying the at least one transformation algorithm to the material property. The term "data processing device" as used herein is a broad term and is to be given its ordinary and customary meaning to a person of ordinary skill in the art and is not to be limited to a special or customized meaning. The term specifically may refer, without limitation, to a computer or a computer system, having at least one processor and optionally having at least one data storage device. Therein, the processor, as an example, may comprise at least one integrated circuit configured for executing computer readable instructions. The processor, additionally or alternatively, may also be or may comprise at least one application-specific integrated circuit and/or at least one field-programmable gate array. The configuration of the data processing device for applying the at least one transformation algorithm, as an example, may be performed by providing a plurality of computer-readable instructions to the data processing device, e.g. via at least one data storage device and/or via at least one interface.

The term "processor", also denoted as processing device, as used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of an electronic device or system, and/or, generally, to a device which is configured for performing calculations or logic operations. In particular, the processor may be configured for processing basic instructions that drive the device or system, such as a computer. As an example, the processor may comprise at least one arithmetic logic unit (ALU), at least one floating-point unit (FPU), such as a math coprocessor or a numeric coprocessor, a plurality of registers, specifically registers configured for supplying operands to the ALU and storing results of operations, and a memory, such as an L1 and L2 cache memory.

The term "algorithm" as used herein is a broad term and is to be given its ordinary and customary meaning to a person of ordinary skill in the art and is not to be limited to a special or customized meaning. The term specifically may refer, without limitation, to a plurality of process steps to be performed subsequently and/or in parallel. The algorithm specifically may comprise one or more mathematical operations to be applied to at least one input variable. Consequently, the term "transformation algorithm" specifically may refer to an algorithm which performs a transforming process for transforming the material property into color values by using one or more mathematical operations to be applied to the at least one input variable. The transformation of the material property into color values may take place in a single step or in a plurality of steps.

The transforming of the material property into color values may comprise subjecting the at least one material property to at least one test, specifically to at least one predetermined test. The at least one test may be or may comprise comparing the at least one material property directly or indirectly, such as by using the at least one item of measurement information, with at least one comparison value, at least one comparison value range or the like. Other mathematical tests are generally feasible and may also be applied. In accordance with the result of the at least one test, the RGB values may be generated. The transforming of the material property into color values specifically may comprise comparing the at least one material property, including the option of using the at least one item of measurement information representing the material property, with at least one threshold value. In accordance with the result of this comparison, for each primary color at least one number may be assigned to the material property.

Preferably, the mining digital image may be generated by scanning, in particular digital scanning, the blend, or at least a region of interest of the blend. The digital scanning may be performed using at least one scanning device. The term "scanning device" as used herein is a broad term and is to be given its ordinary and customary meaning to a person of ordinary skill in the art and is not to be limited to a special or customized meaning. The term specifically may refer, without limitation, to a device configured for detecting at least one property of at least one object and/or element, e.g. of the blend. In particular, the scanning device may be configured for examining and/or detecting at least one material property of the blend. As an example, the scanning device may have at least one scanning element configured for optically recording and/or capturing spatially resolved one-dimensional, two-dimensional or even three-dimensional optical information on the blend. Thus, e.g. for optical detection, the scanning device may, for example, comprise at least one sensor, such as optical sensors, specifically image sensors, e.g. at least one light sensitive capacitor, at least one charge-coupled device (CCD). The scanning device may for example comprise at least one CCD-chip and/or at least one CMOS chip. Specifically, the scanning device may be configured for detecting optical signals of the blend, e.g. of the blended and/or merged powder components, such as by using an optical system. In particular, the scanning system may be configured for convert, e.g. break down, the optical signals of the blend into primary colors, such as into red, green and blue, e.g. by using a prism. The scanning device may specifically be configured for converting the optical signals, such as the optical signals converted into primary colors, into at least one digital image, e.g. by using at least one sensor, such as a sensor comprising a plurality of light-sensitive capacitors. Further, the scanning device may comprise at least one illuminating element, such as an element configured for illuminating the blend, wherein the scanning device may be configured for detecting the at least one property of the blend by using a reflection of the blend. Herein, the scanning device may also be referred to as scanner. The scanning device may specifically be or may comprise a device selected from the group consisting of: a CCD scanner; a CIS scanner; a camera; a film. In particular, the scanning device may comprise at least one optical detection system, specifically comprising one or more of an optical detector, an image sensor, for example a photomultiplier tube (PMT), e.g. a vacuum tube converting incident photons into an electric signal, a silicon photomultiplier (SiPM), e.g. a solid-state device converting incident photons into an electric signal. The scanning device may specifically comprise at least one processor, wherein the processor may be configured for controlling at least one scanning operation of the scanning device.

Scanning may for example be performed using light of a wavelength at scanning in the range of from 10 nm to 1 mm, preferably in the range of from 300 nm to 800 nm. The luminous intensity per m$^2$ of the light used preferably is in the range of from 0.001 lm/m$^2$ and 10000000 lm/m$^2$, more preferable in the range of from 10 lm/m$^2$ and 1000000 lm/m$^2$.

A wavelength spectrum may be set by at least one LED light, e.g. emitting light of a color temperature of 3,000 K.

A local intensity of the of light on the printed pixels may be defined by at least one lens or lens system. The lens or lens system may be configured for generating brighter and darker areas. For example, the lens or lens system may comprise magnifying glass foils.

With respect to embodiments of the printing device, scanning device and pigments reference is made to WO 2021/001147, the full content is included herein by reference.

The method may comprise a combination of the digital proof-of-work blockchain technology, where first a cryptographic puzzle is solved by finding potential nonces, which are added to the hexadecimal numerals of the blockheaders to generate certain hash values of e.g., certain number of "zeros", and in a second step, applying these nonces as mining printer control setting to proof, if a mining printer control setting can transfer an initial digital image into a task digital image, in particular after printing and pixilation. This physical step of printing and scanning will be bottleneck for the processing time, so the computer will not need to be faster than this period of time. Thus, printer speed not computing power dominates a hashing frequency.

The method may be performed with different and/or adjustable mining difficulty. The mining difficulty may be adjustable by one or more of the following variables: amount of pigment colors, size of initial digital image, size of task digital image, number of pixels per same printer control setting, pixel color error tolerance (e.g., red±10%), overall error tolerance (10 of 100 pixel are wrong), rastering, tilting, Moiré-effect. For example, the method may comprise, specifically for further increase of security, changing continuously the size of the individual pixels, e.g., 6 dots instead of 4 dots, and/or a setting of pixelation, e.g., 13 pixels, or even illumination at scanning. That means that this work needs to be done again and again and would drive even further the costs for the attacker. It would be very complex, if possible at all, to set up a model, such as simulation, which could replace the printing and scanning. Specifically, a pigment consumption for printing in advance would require at least a world annual production of 10 million tons.

The method, step iv), comprises comparing the colored pixels of the mining digital image and the task digital image by using the at least one processing device. The method comprises repeating steps ii) to iv) until the colored pixels of the mining digital image and the task digital image are found to be identical. In each case, in step ii), a different mining printer control setting is selected. The mining printer control setting for which the mining digital image and the task digital image are found to be identical, at least within tolerances, is used as the proof-of-work for generating and validating the block of the blockchain.

The comparing of the colored pixels of the mining digital image and the task digital image may be performed pixel-wise. The comparing of the colored pixels of the mining digital image and the task digital image may be performed after grouping the colored pixels of the mining digital image or/and the task digital image by pixelation. Specifically, the method may comprises pixelating the mining digital image and/or the task digital image. The pixelating may comprise dividing the mining digital image and/or the task digital image into pixels, in particular in a pre-defined number of pixels. For example, the pre-defined number of pixels of the mining digital image may correspond to the number of pixels of the task digital image. For example, the pre-defined number of pixels may depend on mining difficulty.

The method may comprise determining a color code of the pixelated mining digital image by converting the colored pixels to, e.g. hexadecimal or binary, numerals. For example, the conversion of the color values into hexadecimal numerals may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The hexadecimal numerals may be further converted into binary code, for example, by using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/.

The comparing of the colored pixels of the mining digital image and the task digital image may comprise comparing color codes of the pixelated mining digital image and the task digital image. The comparing may comprise determining if the mining digital image and the task digital image are identical at least within a pre-defined pixel color tolerance range. The mining digital image and the task digital image may be considered identical within the pixel color error tolerance range of ±30% for each of the colors of a pixel, preferably of ±10% for each of the colors of a pixel, more preferably of ±3% for each of the colors of a pixel. Additionally or alternatively, an overall matching of the mining digital image and the task digital image may be determined. The mining digital image and the task digital image may be considered identical within an overall error tolerance range 10% of deviating pixels, preferably of 5% of deviating pixels, more preferably 1% of deviating pixels. The comparing may be performed by a processing device of the node, e.g. of the printing device.

The method may comprise determining by the nodes of the network if the mining digital image and the task digital image are identical at least within a pre-defined tolerance range. The pixel color error tolerance range of the miner performing the method may be tighter in comparison to the pre-defined tolerance range of the nodes. This may allow ensuring that verifying of the found mining printer control setting is correct within a tolerance range is possible by each of the nodes even if the printing device has a deviating accuracy. The larger error tolerance may take into account that the printing devices at the nodes will usually not work identically compared to each other. If the printer control setting number has been validated by a plurality of other nodes, e.g. by more than 10 different other nodes, the proof of work is correct and the defined amount of tokens may be transferred to the wallet of the node. The other miners may also generate the same mining digital image and will validate the nonce this way. Every mining printer control setting which lays outside an error tolerance will be rejected. Any mining printer control setting inside an error tolerance will be accepted. Hence, whoever finds it first is allowed to add the block to the chain and gets their reward of crypto coins. The awarding based on mined cryptocurrency units and transaction fees may be the same as for bitcoin mining; however, instead of computing power, the printer capacity, and instead of electricity pigments. The printing devices may be implemented in the blockchain network as the mining computers, in particular they may serve for the same function.

The method may comprise at least one calibration. A plurality of pre-specified color fields, such as primary colors of a used color space, may be provided and printed with the mining digital image. This may allow calibration of the scanning result.

The method may comprise generating a header of the subsequent block comprising information about a block version number, a cryptographic hash of the previous block header, a cryptographic hash based on all of the transactions in the block, time, bits and a nonce. The nonce may be the mining printer control setting found to transfer of the initial digital image into the task digital image.

The proposed method has a plurality of advantages. Specifically, the proposed method is quantum-computing secure and allows for energy saving proof-of-work. It is possible to revolutionize the performance of the current cryptocurrency blockchain technologies for environmental and security reasons, as the state-of-the-art blockchain cryptocurrencies produces exorbitant $CO_2$ and are of the risk of being suddenly attacked by new super-computers (51% attack).

As outlined above, the method for proof-of-work as disclosed herein may fully or partially be computer-implemented by at least one computer or computer network. Steps i) to iv) may also be partially computer-implemented or computer-supported.

Consequently, the invention also discloses a computer program and a computer program product having program code means, in order to fully or partially perform or support the method for proof-of-work according to the present invention in one or more of the embodiments enclosed herein when the computer program product or the computer program is executed on a computer or computer network. Specifically, the program code means may be stored on a computer-readable data carrier and/or on a computer-readable storage medium. Disclosed and proposed herein is a computer program including computer-executable instructions for performing the method according to the present invention in one or more of the embodiments enclosed herein when the program is executed on a computer or computer network. Specifically, the computer program may be stored on a computer-readable data carrier and/or on a computer-readable storage medium.

As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method steps i) to iv) as indicated above may be performed by using a computer or a computer network, preferably by using a computer program.

Further disclosed and proposed herein is a computer program product having program code means, in order to perform the method according to the present invention in one or more of the embodiments enclosed herein when the program is executed on a computer or computer network. Specifically, the program code means may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the invention, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, further disclosed herein are:

a computer or computer network comprising at least one processor, wherein the processor is adapted to perform the method according to one of the embodiments described in this description, a computer loadable data structure that is adapted to perform the method according to one of the embodiments described in this description while the data structure is being executed on a computer, a computer program, wherein the computer program is adapted to perform the method according to one of the embodiments described in this description while the program is being executed on a computer, a computer program comprising program means for performing the method according to one of the embodiments described in this description while the computer program is being executed on a computer or on a computer network,

a computer program comprising program means according to the preceding embodiment, wherein the program means are stored on a storage medium readable to a computer, a storage medium, wherein a data structure is stored on the storage medium and wherein the data structure is adapted to perform the method according to one of the embodiments described in this description after having been loaded into a main and/or working storage of a computer or of a computer network, and a computer program product having program code means, wherein the program code means can be stored or are stored on a storage medium, for performing the method according to one of the embodiments described in this description, if the program code means are executed on a computer or on a computer network.

In a further aspect of the present invention, a blockchain based on digital images is disclosed. The blockchain comprises a plurality of linked blocks. The blockchain is generated by using one of the methods for proof-of-work according to the present invention as described above or as described in more detail below. Thus, for definitions and embodiments reference is made to the description the method for proof-of-work.

In a further aspect use of a computer-implemented method for proof-of-work according to any one of the preceding claims, for a purpose of one or more of mining for trading crypto currency, secured processing of transactions in the fields of non-fungible tokens, smart contracts, financial services, healthcare, personal identification, cryptocurrencies, supply chain, secure labels is disclosed. Other applications are possible.

As used herein, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically are used only once when introducing the respective feature or element. In most cases, when referring to the respective feature or element, the expressions "at least one" or "one or more" are not repeated, nonwithstanding the fact that the respective feature or element may be present once or more than once.

Further, as used herein, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

Summarizing and without excluding further possible embodiments, the following embodiments may be envisaged:

Embodiment 1. Computer-implemented method for proof-of-work for generating and validating a block of a blockchain using at least one printing device, wherein the printing device is configured for generating at least one digital image depending on a printer control setting, the method comprising the following steps:

i) determining a plurality of number strings by solving at least one cryptographic puzzle;

ii) selecting one of the number strings of the determined plurality of number strings as mining printer control setting;

iii) printing at least one initial digital image comprising a plurality of colored pixels by using the printing device with the selected mining printer control setting and scanning the printed image by using at least one scanning device, thereby generating a mining digital image having a plurality of colored pixels different from the initial digital image;

iv) comparing the colored pixels of the mining digital image and a task digital image by using at least one processing device, wherein the task digital image comprises a plurality of colored pixels being different from the initial digital image;

wherein the method comprises repeating steps ii) to iv) until the colored pixels of the mining digital image and the task digital image are found to be identical, wherein in each case in step ii) a different mining printer control setting is selected, wherein the mining printer control setting for which the mining digital image and the task digital image are found to be identical, at least within tolerances, is used as the proof-of-work for generating and validating the block of the blockchain.

Embodiment 2. The method according to the preceding embodiment, wherein solving the cryptographic puzzle comprises finding numerals which generate a cryptographic hash value having a defined number of leading numerals.

Embodiment 3. The method according to the preceding embodiment, wherein the leading numerals are identical, Embodiment 4. The method according to the preceding embodiment, wherein the leading numerals are zeros.

Embodiment 5. The method according to any one of the preceding embodiments, wherein the cryptographic hash value comprises hexadecimal numerals.

Embodiment 6. The method according to any one of the two preceding embodiments, wherein solving the cryptographic puzzle comprises finding hexadecimal numerals which generate a cryptographic hash value having a defined number of leading hexadecimal numerals.

Embodiment 7. The method according to any one of the three preceding embodiments, wherein the cryptographic hash value is generated by using at least one hash function having a block number of the block, data stored in the block and the cryptographic hash of a previous block as input.

Embodiment 8. The method according to the preceding embodiment, wherein the hash function is at least one secure hash function SHA-2 selected from the group consisting of SHA-224, SHA-256, SHA-384, SHA-512, SHA-512/224, SHA-512/256.

Embodiment 9. The method according to any one of the five preceding embodiments, wherein the method comprises applying the found numerals as mining printer control settings and checking, if one of the mining control settings transfers the initial digital image into the task digital image.

Embodiment 10. The method according to any one of the preceding embodiments, wherein the block comprises a header comprising information about a block version number, a cryptographic hash of a previous block header, a cryptographic hash of the block, time, bits and a nonce, wherein the nonce is the mining printer control setting found to transfer of the initial digital image into the task digital image, wherein the bits define a number of pixels of the initial digital image and/or the number of pixels of the task digital image.

Embodiment 11. The method according to any one of the preceding embodiments, wherein the mining printer control setting found to transfer the initial digital image into the task digital image is used for generating a numeral to be applied as nonce for generating and validating the block of the blockchain, wherein a size of the nonce is set before printing by an information defining color intensities of each color of a color space used for printing.

Embodiment 12. The method according to the preceding embodiment, wherein the size of the nonce is 4 bytes to define an intensity of colors of the color space in the range of 0 to 255, wherein the intensity is expressed by two hexadecimal numerals for each pigment color.

Embodiment 13. The method according to any one of the preceding embodiments, wherein the method further comprises generating the initial digital image by converting at least one part of a cryptographic hash of a previous block header into color values of the colored pixels.

Embodiment 14. The method according to the preceding embodiment, wherein the generating of the initial digital image comprises converting hexadecimal numerals of the cryptographic hash value of the previous block header into RGB colors of significant optical differences.

Embodiment 15. The method according to any one of the two preceding embodiments, wherein the cryptographic hash value of the previous block header is used to define a size and/or shape of the pixels of the initial digital image before printing.

Embodiment 16. The method according to any one of the three preceding embodiments, wherein the method further comprises generating the task digital image by converting at least one part of the cryptographic hash value other than used for generating the initial digital image into at least one color value of the colored pixels and/or by using at least one random algorithm, and/or by transforming digital information of transaction of a block in color values.

Embodiment 17. The method according to any one of the preceding embodiments, wherein comparing of the colored pixels of the mining digital image and the task digital image is performed pixelwise.

Embodiment 18. The method according to any one of the preceding embodiments, wherein comparing of the colored pixels of the mining digital image and the task digital image is performed after grouping the colored pixels of the mining digital image or/and the task digital image by pixilation.

Embodiment 19. The method according to the preceding embodiment, wherein the method comprises determining a color code of the pixelated mining digital image by converting the colored pixels to numerals, wherein comparing of the colored pixels of the mining digital image and the task digital image comprises comparing color codes of the mining digital image and the task digital image.

Embodiment 20. The method according to any one of the preceding embodiments, wherein the mining digital image and the task digital image are considered identical within a pixel color error tolerance range of ±30% for each of the colors of a pixel, preferably of ±10% for each of the colors of a pixel, more preferably of ±3% for each of the colors of a pixel, and/or wherein the mining digital image and the task digital image are considered identical within an overall error tolerance range 10% of deviating pixels, preferably of 5% of deviating pixels, more preferably 1% of deviating pixels.

Embodiment 21. A computer program comprising instructions which, when the program is executed by one or more processor, cause the processor to perform the method according to any one of the preceding embodiments referring to a method.

Embodiment 22. A computer-readable storage medium comprising instructions which, when the instructions are executed by one or more processors, cause the processor to perform the method according to any one of the preceding embodiments referring to a method.

Embodiment 23. A non-transient computer-readable medium including instructions that, when executed by one or more processors, cause the processor to perform the method according to any one of the preceding embodiments referring to a method.

Embodiment 24. A blockchain based on digital images, wherein the blockchain comprises a plurality of linked blocks, wherein the blockchain is generated by using a method for proof-of-work for generating and validating a block of a blockchain according to any one of the preceding embodiments relating to a method for proof-of-work for generating and validating a block of a blockchain.

Embodiment 25. Use of a computer-implemented method for proof-of-work according to any one of the preceding embodiments relating to a computer-implemented method for proof-of-work for generating and validating a block of a blockchain, for a purpose of one or more of mining for trading crypto currency, secured processing of transactions in the fields of non-fungible tokens, smart contracts, financial services, healthcare, personal identification, cryptocurrencies, supply chain, secure labels.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the FIGURES. Therein, identical reference numbers in these FIGURES refer to identical or functionally comparable elements.

BRIEF DESCRIPTION OF FIGURES

FIG. 1 shows an embodiment of a method for proof of work according to the present invention.

DETAILED DESCRIPTION OF THE EMBODIMENTS

FIG. 1 shows an embodiment of a computer-implemented method for proof-of-work for generating and validating a block of a blockchain using at least one printing device. The printing device is configured for generating at least one digital image depending on a printer control setting.

The generating a block may comprise adding and/or producing and/or creating a new block to a blockchain. The proof-of-work may be a consensus process for securing generation of new blocks of the blockchain. Before a block can be added to the blockchain, information contained by the block needs to be "validated" by a network built on blockchain technology, also denoted as blockchain network. This is may be done by creating a so-called hash by solving a cryptographic puzzle. The process of searching for the solution is usually called "mining" or "mining process". The nodes of the network may check if the found solution is correct. If the nodes confirm its validity, the block is considered validated and can be added to the blockchain.

The block may be a component or an element of the blockchain. Blockchains can be defined as a chain of blocks which can hold certain records and the blocks are linked to one another using the principles of cryptography, for further details see "Eshani et al, "A study on the issue of blockchain's energy consumption", Chapter 2, DOI: 10.1007/978-981-15-0361-0_5 or en.wikipedia.org/wiki/Blockchain. Each block may comprise transaction data. The blocks may be linked by comprising a hash value of the previous block. Each block may comprise a cryptographic hash of the previous block. Each block may further comprise a time-stamp. The blockchain may comprise a plurality of linked blocks.

The block may comprise a header comprising a plurality of fields. Specifically, the header comprises information about a block version number, a cryptographic hash of the previous block header, a cryptographic hash based on all of the transactions in the block, time, bits and the nonce. A structure of the block may be similar to block architecture of Bitcoin, e.g. as described in en.bitcoin.it/wiki/Block_hashing_algorithm. A block header may comprise these fields:

| Field | Size (Bytes) |
|---|---|
| Block version number | 4 |
| a cryptographic hash of the previous block header | 32 |
| a cryptographic hash based on all of the transactions in the block | 32 |
| Time | 4 |
| Bits | 4 |
| Nonce | 4 |

The fields block version number, also denoted as "Version", cryptographic hash of the previous block header, also denoted as "hashPrevBlock", cryptographic hash based on all of the transactions in the block, also denoted as "hashMerkleRoot", and "Time" may be generated in the same way as for Bitcoin and may keep the same meaning. The time may be a timestamp as seconds since 1970-01-01T00:00 UTC. The method may allow adjusting the time to protocol of transactions in each block. However, other times are possible.

The "bits" may define a number of pixels of the initial digital image and/or the number of pixels of the task digital image. The field "bits", e.g. 32-bit "bits", may also be used to define the number of pixels of the task digital image 114. For example, the first 16 bits may be used to define the number of pixels of the initial digital image 116 to be printed. The second 16 bits may be used to define the number of pixels of the task digital image 114. The field "bit" may define the mining difficulty. The field "Bits" may be used to address the difficulty and/or printing time by the number of pixels per each printing and scanning iteration. The larger the number of pixels to be printed, the longer is the printing time and the longer takes the iteration. Thus, the field bit may be used differently as for Bitcoin.

The method may be fully or partially implemented by using a data processing means, such as data processing means comprising at least one processor. The data processing means may comprise be at least one computer and/or at least one network of computers. The computer, additionally, may comprise one or more further components, such as at least one of a data storage device, an electronic interface or a human-machine interface.

The printing device may be or may comprise at least one device configured for applying, e.g. printing, at least one material onto at least one printing surface or substrate, specifically in a patterned fashion, according to the printer control setting. In particular, the printing device may comprise one or more of a drum, such as an image drum; a conveyor such as a transfer belt; a laser, a lens system, such as a lens system comprising at least one mirror, e.g. a rotatable mirror; a cleaning element, such as a roll, a scraper or similar means for cleaning, e.g. for cleaning the drum or the conveyer; a cassette, e.g. for storing one or more of the substrate, such as a paper cassette; at least one transporting element, such as a roller and/or conveyor, e.g. for feeding, transferring and/or ejecting the substrate, specifically the paper, into, within and/or from the printing device; a printer control unit configured for controlling the printing device. In particular, the material is printed on the surface of the drum, such as an image drum, or on the conveyer such as a transfer belt. For example, the printing device may comprise a cassette, e.g. for storing one or more of the substrate, such as a paper cassette; at least one transporting element, such as a roller and/or conveyor, e.g. for feeding, transferring and/or ejecting the substrate, specifically the paper, into, within and/or from the printing device. The printing device may comprise at least one pigment collector configured for collecting pigments from the transfer belt. The printing device may comprise at least one suction mechanism for sucking the pigments from the transfer belt, e.g. into the pigment collector. Other embodiments for transferring the pigments from the transfer belt into the pigment collector may be feasible, e.g. without using a suction mechanism. The printing device may comprise at least one, e.g. further, suction mechanism for transferring the collected pigments from the pigment collector out of the printing device. This may allow to ensure a continuous 24-hours-7-days-a-week operation of the printing device and to avoid the manual emptying the pigment collector in case of being filled with pigments. The printing device may comprise at least one material storage configured for providing pigments for printing. The printing device may comprise at least one dosing mechanism. The dosing mechanism may be configured for transferring pigments from the material storage for printing, e.g. into the printing device. This may allow to ensure a continuous 24-hours-7-days-a-week operation of the printing device and to avoid the manual recharge of the pigment reservoirs in the printing device in case of the pigment reservoirs running out of pigments.

The method comprises (step i), denoted with reference number 110) determining a plurality of number strings by solving at least one cryptographic puzzle. The number strings may be potential mining printer control settings 112 for transferring and/or generating a task digital image 114 from an initial digital image 116.

The printer control setting may be printer control information comprising a plurality of parameters for controlling at least one function of the printing device. For example, the printer control setting may comprise a string of characters of a pre-defined length. The printer control setting may comprise at least one item of blending information, which will be outlined in more detail below. Thus, typically, the printing device may be configured for generating text and/or images on the at least one printing surface according to the printer control setting, such as one or more of a string of characters, a bitmapped image, a vector image, a computer program, e.g. provided in at least one printer control language. In particular, the printing device, specifically at least one function of the printing device, may be controllable via at least one printer control language, such as one or more page description languages (PDLs), printer command languages (PCLs), PostScript, XML Paper Specification and the like. The mining printer control setting 112 may be the printer control setting assumed to be used for transferring and/or generating a task digital image 114 from a initial digital image 116.

The determining of the plurality of number strings, specifically the determining of the plurality of the potential mining printer control settings 112, may be performed by digital mining, e.g. similar as done for Bitcoin mining, by solving at least one cryptographic puzzle. The cryptographic puzzle may be an arbitrary mathematical task having a defined difficulty. Solving the cryptographic puzzle may comprises finding numerals which generate a cryptographic hash value, also denoted as hash value, having a defined number of leading numerals. For example, the numerals are identical. An input for the cryptographic puzzle may be the transactions in the block. The difficulty to control the average time duration for generating a block may be adjusted according to the computing power of the network of involved mining computers. The number of leading numerals of the hash value may be fixedly defined such as set to a number and/or may be defined automatically e.g. by using at least one difficulty algorithm. The latter may comprise re-defining and/or adjusting the number of leading numerals, such as after a defined number of generated blocks. For example, the number of leading numerals may be re-defined and/or adjusted every 2016 blocks. The number of the leading numerals may be re-defined and/or adjusted depending on an average time duration for generating a block, e.g. 10 minutes. The defining of the difficulty is depicted in FIG. 1 with reference number 113. The numeral may be a symbol, or group of symbols denoting a number, e.g. a number string, a hexadecimal numeral and the like. Specifically, the numerals are potential nonces. One of the found nonces may be the printer control setting configured for transferring of the initial digital image into the task digital image. Specifically, one of the nonces may be the mining printer control setting 112 which transfers the initial digital image 116 into a task digital image 114, in particular after one or more of printing, scanning, and pixelation. For example, the cryptographic hash value comprises hexadecimal numerals. Solving the cryptographic puzzle may comprise finding hexadecimal numerals which generate a cryptographic hash value having a defined number of leading hexadecimal numerals, e.g. ten leading zeros. For example, step i) 110 may comprise solving a cryptographic puzzle thereby finding nonces, which are added to the hexadecimal numerals of a header of the block to generate certain hash values of e.g., certain number of "zeros".

The cryptographic hash value may be generated by using at least one hash function having a block number of the block, data stored in the block and the cryptographic hash of a previous block as input. The hash function may be an arbitrary function that can be used to map data of arbitrary size to fixed-size values. The values returned by a hash function are called hash values. The cryptographic hash value may be a numeric value of a fixed length which uniquely representing data. For example, the cryptographic hash value may comprise hexadecimal numerals. The data may be information and/or to machine-readable signals or symbols representative for information. The data specifically may be or may comprise one or both of digital data and analogue data. For example, the hash function may be at least one secure hash function SHA-2 selected from the group consisting of SHA-224, SHA-256, SHA-384, SHA-512, SHA-512/224, SHA-512/256. For example, a current block's version number, the data stored in the block (including the nonce) and the hash value of the previous block may be used as input for the hash function.

The method further comprises, in step ii) 118, selecting one of the number strings of the determined plurality of number strings as mining printer control setting 112. Specifically, the method comprises applying the found numerals as mining printer control settings 112 and checking, if one of the mining control settings 112 transfers the initial digital image 116 into the task digital image 114. The mining printer control setting may be selected iteratively. The mining printer control setting 112 found to transfer the initial digital image 116 into the task digital image 114 is used for generating a numeral to be applied as nonce for generating and validating the block of the blockchain.

The method further comprises, in step iii), 120 printing at least one initial digital image 116 comprising a plurality of colored pixels by using the printing device with the selected mining printer control setting 112 and scanning the printed image by using at least one scanning device, thereby generating a mining digital image 122 having a plurality of colored pixels different from the initial digital image 116.

A size of the nonce may be set before printing. For example, the size of the nonce may be set by an information defining color intensities of each color of the color space used for printing. For example, the intensity of each color of a color space, e.g. the CMYK color space, can be varied from 0-255. Thus, a structure of the nonce may be {CC-MM-YY-KK}. For example, the size of the nonce is 4 bytes to define an intensity of colors of a color space in the range of 0 to 255. Specifically, the size of the nonce is 4 bytes to define an intensity of four colors of the color space in the range of 0 to 255. The intensity may be expressed by two hexadecimal numerals for each color.

The method further may comprise generating the initial digital image 116 by converting at least one part of a cryptographic hash of a previous block header into color values of the colored pixels. The generating at least one initial digital image 116 may comprise a process of determining the color of pixels of the initial digital image 116. The initial digital image 116 may be an arbitrary digital image used as a starting point for mining. The initial digital image 116 may be generated by converting at least one part of the cryptographic hash value of a previous block header into color values of the colored pixels of the initial digital image 116. For example, the generation of initial digital image 116 may comprise converting at least one part of the hexadecimal numerals of the cryptographic hash value of a previous block header in to RGB colors to print the initial digital image on a substrate using pigment particles according to a further color space, e.g. the CMYK color space. For example, the conversion of the hexadecimal numerals into color values may be performed using at least one mathematical algorithm and/or at least one pre-determined relationship such as a look-up table, e.g. as described in www.rapidtables.com/convert/color/hex-to-rgb.html, or "The Image-Interface: Graphical Supports for Visual Information", Everardo Reyes-Garcia, John Wiley & Sons, 2017, ISBN 978-1-1194-7497-5.

The generating of the initial digital image 116 may comprise selecting hexadecimal numerals from the cryptographic hash value of a previous block header. For example, the cryptographic hash value may be used as comprised in the block's header. For example, for a first pixel of the initial digital image 116 the first six digits of the hexadecimal numerals may be selected and converted into an RGB color. For the further pixels of the initial digital image 116 consecutively the next six digits may be selected and converted into RGB colors. However, other embodiments for selecting hexadecimal numerals from the cryptographic hash are possible. For example, the cryptographic hash value of a previous block header may be processed e.g. by sorting and/or at least one further mathematical algorithm. For example, the method may comprise generating for each pixel of the initial digital image 116 a table comprising rows and columns. Each row may comprise a differently processed version of the initially cryptographic hash value. For example, for a first pixel of the initial digital image 116 the numerals of the first six rows of the first column may be selected. For the further pixels of the initial digital image 116 consecutively the next rows and/or columns may be selected.

The generating of the initial digital image 116 may comprise converting hexadecimal numerals of the cryptographic hash value of a previous block header into RGB colors of significant optical differences. E.g., the conversion of the hexadecimal numerals of the cryptographic hash value into RGB colors of significant optical differences may be done according to a predefined lookup table (illustratively done for 4-bit color space):

| hexadecimal numeral of the cryptographic hash | hexadecimal code of RGB color | Appearance of RGB color |
| --- | --- | --- |
| 0 | FFFFFF | white |
| 1 | FFFFC0 | lemon yellow |
| 2 | FFFF00 | yellow |
| 3 | C0FFC0 | mint |
| 4 | 40FF00 | lawn green |
| 5 | 00C000 | lemon green |
| 6 | C0FFFF | pale turquoise |
| 7 | 00FFFF | cyan |
| 8 | 00C0C0 | dark turquoise |
| 9 | 807FFF | light purpe |
| a | 0000FF | blue |
| b | FFD0FF | lavender |
| c | FF00FF | pink |
| d | C060C0 | purple |
| e | FF4040 | red |
| f | 000000 | black |

The RGB color space may be a 24 bit color space. An RGB color palette may comprise $(2^8)^3$ colors. In order to achieve significant optical differences, only two hexadecimal numerals may be used for defining the respective RGB color.

The cryptographic hash value of a previous block header may be used to define a size and/or shape of the pixels of the initial digital image 116 before printing on the substrate. The hexadecimal numerals of the cryptographic hash value of a previous block header is preferably used to define the amount of color dots per pixel. The hexadecimal numerals of the cryptographic hash value of a previous block header may be used to define the amount of color dots per pixel. The method may comprise generating for each pixel of the initial digital image 116 a table comprising rows and columns. Each row may comprise a differently processed version of the initially cryptographic hash value. For example, the size of the first pixel of the initial digital image 116 may be defined by a seventh row of the first column. For the further pixels of the initial digital image consecutively the next seventh rows and/or columns may be selected. The shape of the pixel may be defined by a part of the cryptographic hash value. For example, the seventh row may be used for the shape, too, and/or another row may be used for defining the shape. For example, the pixel may be circular-shaped for numerals between 0 and 4; triangle-shaped for numerals between 5-8; square-shaped for numerals between 9 and B and/or rhombus-shaped for numerals between C and F. However, other embodiments are feasible.

The task digital image 114 may be an arbitrary digital image used as cryptographic puzzle. The task digital image 114 comprises a plurality of colored pixels different from the initial digital image 116. The colored pixels of the task digital image 114 may have identical or different color values. The colored pixels of the initial digital image 116 and/or the task digital image 114 may be colored pixels of the RGB color space.

The task digital image 114 may be generated by converting at least one part other than used for generating the initial digital image 116 of the cryptographic hash value of a previous block header into at least one color value of the colored pixels. With respect to converting at least one part of the cryptographic hash value into color values for the pixels of the task digital image 114 reference is made to the generating of the initial digital image 114. However, for the task digital image 116 a part of the cryptographic hash value other than for the initial digital image may be used. However, other color spaces may be possible. For example, for mining, first the RGB color of the task digital image 114 may be defined automatically. For this, e.g. the last 24 bits of the cryptographic hash of the previous block may be taken.

Additionally or alternatively, the task digital image 114 may be generated by using at least one random algorithm. Such random algorithms are generally known to the skilled person. The random numbers such as hexadecimal numbers generated by the random algorithm may be converted into color values. The conversion of the hexadecimal numerals into the color values may be performed using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/.

Additionally or alternatively, the task digital image 114 may be provided by transforming digital information of transaction of a block, such as of the block to be added or of a previous block, in color values, e.g. in RGB colors or CMYK colors. The transaction may comprise financial transactions such as payments, licensing, orders, invoices, and/or logistic transactions such as deliveries, storage records, travel records, and/or transactions relating to plans, and/or tax declarations, and/or contracts, and/or personal health information and the like. The digital information of transaction may be data describing at least one transaction, also denoted as transaction data. The transaction data may comprise information about one or more of time of transaction, a numerical value of the transaction a text of the transaction, a digital picture of the transaction, a text of the transaction, a digital image of the transaction and the like. The transaction data may be provided in binary format.

The mining proposed by the present invention is about finding the mining printer control setting 112 of the plurality of mining printer control settings 112 transferring the initial digital image 116 into the task digital image 114. The miners compete to find, firstly, the plurality of potential mining printer control settings by solving the cryptographic puzzle and, subsequently, identifying the mining printer control setting 112 number of the plurality of potential mining printer control settings 112, which converts the initial digital image into the task digital image. The miner, who has found the mining printer control setting 112 transferring the initial digital image 116 into the task digital image 114 first may be awarded. The other miners may check the mining printer control setting 112.

The mining digital image 122 has a plurality of colored pixels different from the initial digital image 116. The colored pixels of the mining digital image 122 may be colored pixels of CMYK or RGB colors space. The mining digital image 122 may be a digital image being generated by printing the initial digital image 116 using the printing device by blending and/or mixing pigments with the selected mining printer control setting 112 and scanning the printed image by using at least one scanning device. The printing may comprise printing on a substrate. The blending may comprise at least one process of mixing pigments in a defined manner, thereby creating a blend. The printing device may be configured for use as a blending device. Specifically, the printing device is configured for receiving the at least one item of blending information and for generating the digital image.

With respect to embodiments of the printing device, scanning device and pigments reference is made to WO 2021/001147, the full content is included herein by reference.

The method may comprise a combination of the digital proof-of-work blockchain technology, where first a cryptographic puzzle is solved by finding potential nonces, which are added to the hexadecimal numerals of the blockheaders to generate certain hash values of e.g., certain number of "zeros", and in a second step, applying these nonces as mining printer control setting to proof, if a mining printer control setting can transfer an initial digital image 116 into a task digital image 114, in particular after printing and pixilation. This physical step of printing and scanning will be bottleneck for the processing time, so the computer will not need to be faster than this period of time. Thus, printer speed not computing power dominates a hashing frequency.

The method further comprises, in step iv) 124, comparing the colored pixels of the mining digital image 122 and the task digital image 114 by using the at least one processing device. The method comprises repeating steps ii) to iv) until the colored pixels of the mining digital image 122 and the task digital image 114 are found to be identical. In each case, in step ii), a different mining printer control setting 112 is selected. The mining printer control setting 112 for which the mining digital image 122 and the task digital image 114 are found to be identical, at least within tolerances, is used as the proof-of-work for generating and validating the block of the blockchain.

The comparing of the colored pixels of the mining digital image 122 and the task digital image 114 may be performed pixelwise. The comparing of the colored pixels of the mining digital image 122 and the task digital image 114 may be performed after grouping the colored pixels of the mining digital image or/and the task digital image by pixelation. Specifically, the method may comprises pixelating the mining digital image 122 and/or the task digital image 114. The pixelating may comprise dividing the mining digital image 122 and/or the task digital image 114 into pixels, in particular in a pre-defined number of pixels. For example, the pre-defined number of pixels of the mining digital image 122 may correspond to the number of pixels of the task digital image 114. For example, the pre-defined number of pixels may depend on mining difficulty.

The method may comprise determining a color code of the pixelated mining digital image 122 by converting the colored pixels to, e.g. hexadecimal or binary, numerals. For example, the conversion of the color values into hexadecimal numerals may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The hexadecimal numerals may be further converted into the binary code, for example, by using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/.

The comparing of the colored pixels of the mining digital image 122 and the task digital image 114 may comprise comparing color codes of the pixelated mining digital image 122 and the task digital image 114. The comparing may comprise determining if the mining digital image 122 and the task digital image 114 are identical at least within a pre-defined pixel color tolerance range. The mining digital image 122 and the task digital image 114 may be considered identical within the pixel color error tolerance range of ±30% for each of the colors of a pixel, preferably of ±10% for each of the colors of a pixel, more preferably of ±3% for each of the colors of a pixel. Additionally or alternatively, an overall matching of the mining digital image 122 and the task digital image 114 may be determined. The mining digital image 122 and the task digital image 114 may be considered identical within an overall error tolerance range 10% of deviating pixels, preferably of 5% of deviating pixels, more preferably 1% of deviating pixels. The comparing may be performed by a processing device of the node, e.g. of the printing device.

The method may comprise determining by the nodes of the network if the mining digital image 122 and the task digital image 114 are identical at least within a pre-defined tolerance range. The pixel color error tolerance range of the miner performing the method may be tighter in comparison to the pre-defined tolerance range of the other nodes. This may allow ensuring that verifying of the found mining printer control setting 112 is correct within a tolerance range is possible by each of the nodes even if the printing device has a deviating accuracy. The other miners may also generate the same mining digital image 122 and will validate the nonce this way. Every mining printer control setting 112 which lays outside an error tolerance will be rejected. Any mining printer control setting 112 inside an error tolerance will be accepted. Hence, whoever finds it first is allowed to add the block to the chain and gets their reward of crypto coins. The awarding based on mined cryptocurrency units and transaction fees may be the same as for bitcoin mining; however, instead of computing power, the printer capacity, and instead of electricity pigments. The printing devices may be implemented in the blockchain network as the mining computers, in particular they may serve for the same function.

The method may comprise at least one calibration. A plurality of pre-specified color fields, such as primary colors of a used color space, may be provided and printed with the mining digital image 122. This may allow calibration of the scanning result.

The method may comprise generating a header of the subsequent block comprising information about a block version number, a cryptographic hash of the previous block header, a cryptographic hash based on all of the transactions in the block, time, bits and a nonce. The nonce may be the mining printer control setting 112 found to transfer of the initial digital image 116 into the task digital image 114.

LIST OF REFERENCE NUMBERS 110 step i)
112 mining printer control setting
113 difficulty
114 task digital image
116 initial digital image
118 step ii)
120 step iii)
122 mining digital image
124 step iv)

The invention claimed is:

1. A computer-implemented method for proof-of-work for generating and validating a block of a blockchain using at least one printing device, wherein the printing device is configured for generating at least one digital image depending on a printer control setting, the method comprising the following steps:

i) determining a plurality of number strings by solving at least one cryptographic puzzle;
ii) selecting one of the number strings of the determined plurality of number strings as mining printer control setting;
iii) printing at least one initial digital image comprising a plurality of colored pixels by using the printing device with the selected mining printer control setting and scanning the printed image by using at least one scanning device, thereby generating a mining digital image having a plurality of colored pixels different from the initial digital image;
iv) comparing the colored pixels of the mining digital image and a task digital image by using at least one processing device, wherein the task digital image comprises a plurality of colored pixels being different from the initial digital image;
wherein the method comprises repeating steps ii) to iv) until the colored pixels of the mining digital image and the task digital image are found to be identical, wherein in each case in step ii) a different mining printer control setting is selected, wherein the mining printer control setting for which the mining digital image and the task digital image are found to be identical, at least within tolerances, is used as the proof-of-work for generating and validating the block of the blockchain.

2. The method according to claim 1, wherein solving the cryptographic puzzle comprises finding numerals which generate a cryptographic hash value having a defined number of leading numerals.

3. The method according to claim 2, wherein solving the cryptographic puzzle comprises finding hexadecimal numerals which generate a cryptographic hash value having a defined number of leading hexadecimal numerals.

4. The method according to claim 1, wherein the cryptographic hash value is generated by using at least one hash function having a block number of the block, data stored in the block and the cryptographic hash of a previous block as input.

5. The method according to claim 1, wherein the method comprises applying the found numerals as mining printer control setting and checking, if one of the mining control setting transfers the initial digital image into the task digital image.

6. The method according to claim 1, wherein the block comprises a header comprising information about a block version number, a cryptographic hash of a previous block header, a cryptographic hash of the block, time, bits and a nonce, wherein the nonce is the mining printer control setting found to transfer of the initial digital image into the task digital image, wherein the bits define a number of pixels of the initial digital image and/or the number of pixels of the task digital image.

7. The method according to claim 1, wherein the mining printer control setting found to transfer the initial digital image into the task digital image is used for generating a numeral to be applied as nonce for generating and validating the block of the blockchain, wherein a size of the nonce is set before printing by an information defining color intensities of each color of a color space used for printing.

8. The method according to claim 1, wherein the method further comprises generating the initial digital image by converting at least one part of a cryptographic hash of a previous block header into color values of the colored pixels.

9. The method according to claim 8, wherein the method further comprises generating the task digital image by converting at least one part of the cryptographic hash value other than used for generating the initial digital image into at least one color value of the colored pixels and/or by using at least one random algorithm, and/or by transforming digital information of transaction of a block in color values.

10. The method according to claim 1, wherein comparing of the colored pixels of the mining digital image and the task digital image is performed after grouping the colored pixels of the mining digital image or/and the task digital image by pixilation, wherein the method comprises determining a color code of the pixelated mining digital image by converting the colored pixels to numerals, wherein comparing of the colored pixels of the mining digital image and the task digital image comprises comparing color codes of the mining digital image and the task digital image.

11. The method according to claim 1, wherein the mining digital image and the task digital image are considered identical within a pixel color error tolerance range of ±30% for each of the colors of a pixel, preferably of ±10% for each of the colors of a pixel, more preferably of ±3% for each of the colors of a pixel, and/or wherein the mining digital image and the task digital image are considered identical within an overall error tolerance range 10% of deviating pixels, preferably of 5% of deviating pixels, more preferably 1% of deviating pixels.

12. A computer program embodied on a non-transitory computer-readable medium comprising instructions which, when the program is executed by one or more processor, cause the processor to perform the method according to claim 1 referring to a method.

13. A non-transitory computer-readable medium including instructions that, when executed by one or more processors, cause the processor to perform the method according to claim 1 referring to a method.

14. A blockchain comprises a plurality of linked blocks, wherein each block includes image-derived data generated from at least one digital image, and wherein the blockchain is generated by using a method for proof-of-work for generating and validating a block of a blockchain according to claim 1 relating to a method for proof-of-work for generating and validating a block of a blockchain.

15. A method comprising utilizing the computer-implemented method for proof-of-work according to claim 1 relating to a computer-implemented method for proof-of-work for generating and validating a block of a blockchain, for a purpose of one or more of mining for trading crypto currency, secured processing of transactions in the fields of non-fungible tokens, smart contracts, financial services, healthcare, personal identification, cryptocurrencies, supply chain, secure labels.

\* \* \* \* \*